(12) United States Patent
Son et al.

(10) Patent No.: US 10,666,327 B2
(45) Date of Patent: May 26, 2020

(54) ELECTRONIC DEVICE AND METHOD FOR CORRECTING PHASE IN ELECTRONIC DEVICE

(71) Applicant: Samsung Electronics Co., Ltd., Suwon-si, Gyeonggi-do (KR)

(72) Inventors: Bong-Sup Son, Daegu (KR); Dong-Ju Lee, Daegu (KR); Won-Jin Choi, Gumi-si (KR); Seok-Kun Hyung, Gumi-si (KR); Sung-Jun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/163,144

(22) Filed: Oct. 17, 2018

(65) Prior Publication Data

US 2019/0165837 A1 May 30, 2019

(30) Foreign Application Priority Data

Nov. 28, 2017 (KR) .......................... 10-2017-0160787

(51) Int. Cl.
*H04B 1/38* (2015.01)
*H04B 7/0413* (2017.01)
*H04B 17/14* (2015.01)
*H04B 7/04* (2017.01)

(52) U.S. Cl.
CPC ............ *H04B 7/0413* (2013.01); *H04B 7/04* (2013.01); *H04B 17/14* (2015.01)

(58) Field of Classification Search
CPC ......... H04B 7/0413; H04B 17/14; H04B 7/04
USPC ............................................................ 455/73
See application file for complete search history.

(56) References Cited

U.S. PATENT DOCUMENTS

| | | | | |
|---|---|---|---|---|
| 4,148,031 A * | 4/1979 | Fletcher | ............... | H01Q 3/2647 342/370 |
| 5,424,863 A * | 6/1995 | Gertel | ................ | H04B 10/2572 398/152 |
| 6,728,517 B2 * | 4/2004 | Sugar | ..................... | H04B 1/005 455/272 |
| 6,831,562 B2 * | 12/2004 | Rodgers | ................... | H01Q 7/00 340/572.4 |
| 7,636,554 B2 * | 12/2009 | Sugar | ..................... | H04B 1/005 455/73 |
| 8,442,476 B2 * | 5/2013 | Haber | ............... | H04W 52/0277 455/343.3 |

(Continued)

*Primary Examiner* — April G Gonzales

(57) ABSTRACT

According to various embodiments disclosed herein, an electronic device includes a transceiver configured to generate a first signal and a second signal, a first coupler configured to receive the first signal from the transceiver and provide the first signal to the first antenna; a second coupler configured to receive the second signal from the transceiver and provide the second signal to the second antenna; and a control circuitry operatively connected to the transceiver. The control circuitry is configured to determine values associated with a phase difference between the first signal and the second signal at least partially based on the signals from the first coupler and the second coupler, and to cause the transceiver to adjust a phase of the first signal and/or a phase of the second signal using at least some of the values in order to reduce or remove the phase difference. Other embodiments have been provided.

16 Claims, 26 Drawing Sheets

(56) References Cited

U.S. PATENT DOCUMENTS

| | | | |
|---|---|---|---|
| 2005/0026570 A1* | 2/2005 | Han | H04B 1/0475 455/73 |
| 2010/0234037 A1* | 9/2010 | Terry | H04L 1/0023 455/450 |
| 2012/0003943 A1* | 1/2012 | Marinier | H04W 36/0083 455/73 |
| 2013/0235962 A1* | 9/2013 | O'Keefe | H01Q 3/267 375/371 |
| 2014/0133477 A1* | 5/2014 | Siomina | H04W 56/0055 370/350 |
| 2014/0348090 A1* | 11/2014 | Nguyen | H04W 72/042 370/329 |
| 2015/0156762 A1* | 6/2015 | Hwang | H04L 1/1671 370/311 |
| 2016/0037322 A1* | 2/2016 | Nguyen | H04W 56/002 370/329 |
| 2016/0205679 A1* | 7/2016 | Yoo | H04L 1/0026 370/329 |
| 2016/0294401 A1* | 10/2016 | Jin | H03L 7/093 |

* cited by examiner

ELECTRONIC DEVICE AND METHOD FOR CORRECTING PHASE IN ELECTRONIC DEVICE

CROSS-REFERENCE TO RELATED APPLICATIONS AND CLAIM OF PRIORITY

This application claims the priority under 35 U.S.C. § 119(a) to Korean Patent Application Serial No. 10-2017-0160787, which was filed in the Korean Intellectual Property Office on Nov. 28, 2017, the entire content of which is hereby incorporated by reference.

BACKGROUND

1. Field

Various embodiments disclosed herein relate to a method for correcting the phase of a transmission signal transmitted through an antenna in an electronic device.

2. Description of Related Art

Efforts are underway to develop an improved 5G ($5^{th}$-generation) communication system or a pre-5G communication system in order to meet the growing demand for wireless data traffic after commercialization of the 4G ($4^{th}$-generation) communication system. For this reason, the 5G communication or the pre-5G communication system is referred to as a "beyond 4G network communication system" or a "post-Long Term Evolution (LTE) system".

Methods for using multiple antennas as methods for improving transmission/reception data efficiency in a wireless communication system are being studied. For example, a Multiple-Input Multiple-Output (MIMO) technique is a technique that is capable of improving transmission/reception data efficiency by employing multiple transmission antennas and multiple reception antennas, turning away from a technique that uses one transmission antenna and one reception antenna. Multiple-antenna systems include a space diversity-based system that increases transmission reliability by simultaneously transmitting the same data to a plurality of transmission antennas to obtain a diversity gain, a space multiplexing-based system that enhances a transmission rate by transmitting a large number of data symbols simultaneously through a plurality of different antennas, and so on.

SUMMARY

For example, in a transmission (Tx) diversity system that outputs the same Primary Carrier Component (PCC) signals through a plurality of antennas in an electronic device (e.g., a user equipment), since it is necessary to transmit transmission signals through two paths, two transmission signals are required. When transmitting the two transmission signals through a plurality of respective antennas at the same time, an undesired random phase difference may occur in a transceiver or a phase delay may occur due to a difference in physical path length. Due to the undesired phase difference between the two transmission signals, an expected antenna beam cannot be formed. When the phases of the two transmission signals are different from each other, it may be difficult to obtain a proper beam-forming gain.

Various embodiments disclosed herein provide an electronic device and a transmission diversity phase correction method in the electronic device, in which a phase difference between transmission signals can be corrected by feeding back signals transmitted to respective antennas from a transmission diversity system that outputs the same PCC signals through a plurality of antennas and determining a phase for optimal beam-forming.

Various embodiments disclosed herein provide an electronic device and a transmission diversity phase correction method in the electronic device, in which a phase for optimal beam-forming can be corrected by feeding back signals transmitted to respective antennas from a transmission diversity system that outputs the same PCC signals through a plurality of antennas and correcting a phase difference between the signals.

In order to solve the above-mentioned problems and other problems, an electronic device according to one embodiment includes: a housing; a first antenna located inside the housing or in a first portion on the housing; a second antenna located inside the housing or in a second portion on the housing to be spaced apart from the first portion of the housing; a transceiver configured to generate a first signal and a second signal; a first coupler electrically connected between the first antenna and the transceiver, and configured to receive the first signal from the transceiver and forward the first signal to the first antenna and a first feedback signal of the first signal to a control circuitry; a second coupler electrically connected between the second antenna and the transceiver, and configured to receive the second signal from the transceiver and forward the second signal to the second antenna, and a second feedback signal of the second signal to the control circuitry; and a control circuitry operatively connected to the transceiver. The control circuitry may be configured to determine values associated with a phase difference between the first signal and the second signal by comparing the first feedback signal sent from from the first coupler to the second feedback signal sent from the second coupler, and to cause the transceiver to adjust a phase of the first signal and/or a phase of the second signal using at least some of the values in order to reduce or remove the phase difference.

A transmission diversity phase correction method in an electronic device according to any one of various embodiments includes: receiving a first signal at a first coupler electrically connected between a first antenna and a transceiver from the transceiver and providing the first signal to the first antenna receiving a second signal at a second coupler electrically connected between a second antenna and the transceiver from the transceiver and providing the second signal to the second antenna; receiving a first feedback signal of the first signal fed back from the first coupler and a second feedback signal sent from the second coupler; determining values associated with a phase difference between the first signal and the second signal by comparing the first and second feed back signals; and adjusting a phase of the first signal and/or a phase of the second signal using at least some of the values in order to reduce or remove the phase difference.

According to an electronic device and a method for correcting a transmission diversity phase in the electronic device in according to various embodiments, it is possible to correct a phase for optimal beam-forming by correcting a phase difference between signals based on a signal transmitted to each antenna in a transmission diversity system that outputs the same signal through a plurality of antennas.

According to an electronic device and a method for correcting a transmission diversity phase in the electronic device according to various embodiments, it is possible to correct a phase for optimal beam-forming by correcting a phase difference between signals by feeding back a signal transmitted to each antenna in a transmission diversity system that outputs the same signal through a plurality of antennas.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
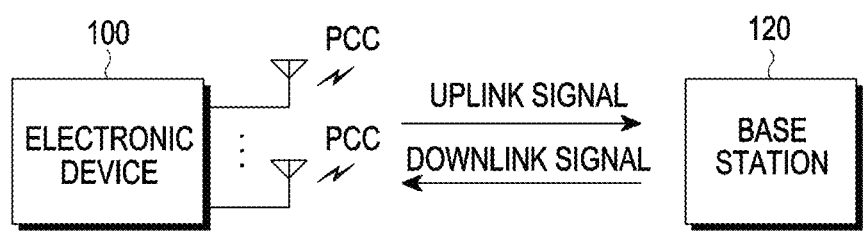
FIG. 1 is an exemplary diagram illustrating a network environment that provides transmission diversity according to various embodiments of the present disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "plural" may mean at least two.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The HMD device may include at least one of an accessory type device (e.g., a watch, a ring, a bracelet, an ankle bracelet, a necklace, a pair of glasses, a contact lenses, a head mounted device (HMD), or a head mounted display (HMD)), a fabric or clothing integrated device (e.g., electronic clothing), a body attachment device (e.g., a skin pad or tattoo), and a bio-implantable circuit. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology Various embodiments disclose an electronic device and a transmission diversity phase correction method in the electronic device, in which a phase difference between transmission signals can be corrected by feeding back signals transmitted to respective antennas from a transmission diversity system that outputs the same PCC signals through a plurality of antennas and determining a phase for optimal beam-forming.

In the following description, an electronic device is referred to as a user equipment ("UE") for convenience of explanation. However, the UE referred to in the following embodiments may include various types of electronic devices described above, and may be replaced with the various types of electronic devices.

In addition, various embodiments are described herein as operating in an LTE wireless communication network, as an example. However, various embodiments are not limited to a specific network type. For example, the wireless communication network may include at least one of, for example, LTE, LTE-A, CDMA, WCDMA, UMTS, WiBro, and GSM as a cellular communication protocol. In addition, the wireless communication network may be configured with various communication networks such as a Personal Area Network (PAN), a Local Area Network (LAN), a Metropolitan Area Network (MAN), and a Wide Area Network (WAN). In addition, the wireless communication network may be a well-known World Wide Web (WWW) or may use a wireless transmission technology used for short-distance communication such as Infrared Data Association (IrDA) or Bluetooth.

The wireless communication network herein may be a specific node of a wireless communication network. For example, the wireless communication network may be a base station of a wireless communication network, a subscriber information management node, a mobility management node, and the like.

Herein, the wireless communication network may include a Home Location Register (HLR) and an Authentication Center (AuC) server, to which a UE is connected so as to perform a subscriber authentication function, and may include a network and a server to which the UE is connected after the authentication so as to provide voice communication or data communication.

The term "UE" as used herein refers to as a Mobile Station (MS), a terminal, a User Terminal (UT), a wireless terminal, an Access Terminal (AT), a subscriber unit, a Subscriber Station (SS), a wireless device, a wireless communication device, a Wireless Transmission/Reception Unit (WTRU), a mobile node, a mobile, or other terminologies. Various embodiments of the UE may include a cellular phone, a smart phone having a wireless communication function, a tablet having a wireless communication function, a wearable device having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and reproducing appliance having a wireless communication function, and an Internet appliance capable of wireless Internet access and browsing, as well as a portable unit or UEs incorporating combinations of such functions. An instrument including a communication function may also be included in the UE.

Also, the UE herein may include a Machine-to-Machine (M2M) UE, a Machine-Type Communication (MTC) UE/device, but is not limited thereto.

In addition, certain terms used herein may be defined as including at least some of the functions defined in a related standard document (e.g., an LTE-related standard document, etc.), and, in addition to the functions defined in the standard document, may also be defined as including further functions performed in various embodiments disclosed herein.

FIG. 1 is a diagram illustrating a network environment that provides transmission diversity according to various embodiments of the present disclosure. Referring to FIG. 1, a network according to various embodiments may include an electronic device 100 (e.g., a UE) and a base station 120.

The electronic device 100 may include a plurality of antennas, which may transmit the same or different signals. According to various embodiments, the plurality of antennas of the electronic device 100 may transmit Primary Carrier Component (PCC) signals of the same frequency to the base station 120, and the electronic device or a network including the electronic device may be referred to as a transmission diversity system.

A signal transmitted from the electronic device 100 to the base station 120 may be referred to as an uplink signal and a signal transmitted from the base station 120 to the electronic device 100 may be referred to as a downlink signal. According to various embodiments, it is possible to correct a phase difference between transmission signals of uplink signals transmitted from the electronic device 100 having the plurality of antennas through each of the antennas. According to various embodiments, the electronic device 100 may transmit the same PCC signals to the base station 120 by forming one transmission beam through the plurality of antennas.

By compensating for a random phase between respective transmission signals, which may occur due to physical factors of an electronic device 100 in the electronic device 100 that supports a Beam-Forming Transmission Diversity (BFTD) function, the transmission beam-forming function can be controlled more efficiently.

The electronic device 100 may include four antenna structures using a housing for signal transmission/reception with the base station 120. In the electronic device 100, a reception (Rx) diversity antenna may be configured through the four antenna structures in order to receive neighboring base station 120 information and a cellular carrier signal. For example, a device having four Rx diversity antennas may be referred to as a 4-RX Diversity (4-RXD) system.

Primary cell (P-cell) information and Secondary cell (S-cell) information can be identified based on the base station information received through the four Rx diversity antennas. That is, communication signals of two specific frequency bands (e.g., B1 and B5 bands) received from the P-cell and the S-cell among the four Rx diversity antennas can be identified. A first frequency band corresponding to the P-cell may be referred to as a Primary Component Carrier (PCC), and a second frequency band corresponding to the S-cell may be referred to as a Secondary Component Carrier (SCC).

For example, in the LTE (4G), each of the PCC and SCC may use a signal in a 20 MHz band, and may use the frequency band while distinguishing a downlink signal and an uplink signal from each other. For example, when the PCC signal uses a B5 frequency band, the uplink signal may use an 829 to 849 MHz band, and the downlink signal may use an 874 to 894 MHz band. According to various embodiments, the LTE frequency band may be assigned a band number depending on a carrier frequency or a duplex mode (FDD/TDD) according to 3GPP standards.

B1 may mean an LTE signal having a carrier frequency of 2100 MHz (High-Band (HB)), and B5 may mean an LTE signal having a carrier frequency of 850 MHz (Low-Band (LB)).

Digital Beam-Forming (DBF) technique refers to a technique of forming a beam pattern in a desired direction using an array antenna. For example, the maximum power may be supplied in a desired direction by controlling the power and phase to be supplied to the array antenna. By using the above-described technique, it is possible not only to improve reception sensitivity, but also to increase a data transmission speed and to minimize call collision. For example, the technique may be employed in Wibro, WLAN, or the like.

The beam-forming is a technique of forming a beam in one direction through the control of a phase difference between signals transmitted through a plurality of array antennas.

It is difficult to ensure communication quality in various situations in which an electronic device is placed only by a single transmission signal transmitted from the electronic device 100 to the base station 120. For example, due to Total Radiated Power (TRP) and call drop improvements and a power transmission mute phenomenon due to the lack of power to reach the base station, the transmission signal is not transmitted properly from the talking side and thus the base station cannot receive transmission data. As a result, a phenomenon in which voice data cannot be transmitted to the opposite party may occur. In order to improve this phenomenon, the electronic device 100 may transmit a plurality of transmission signals to increase the accuracy of signal transmission.

The phase difference between respective transmission signals may be minimized through the correction of a phase difference between a first transmission signal and a second transmission signal in an electronic device supporting the BFTD. According to various embodiments, an optimal transmission beam pattern can be generated by determining phase values for optimal beam-forming according to the respective antenna positions of the electronic device 100 and then reading a Reference Signals Received Power (RSRP) value of each antenna.

In the electronic device 100 supporting the BFTD, it is possible to solve problems such as call dropping and muting, which are caused due to an antenna beam pattern deformation phenomenon caused due to occurrence of a phase difference between respective transmission signals, and a problem of outputting transmission power different from the request of the base station.

The phase of the transmission signal transmitted from the electronic device can be readjusted by measuring transmitted signal information using a combiner or a phase detector.

Figure 2:
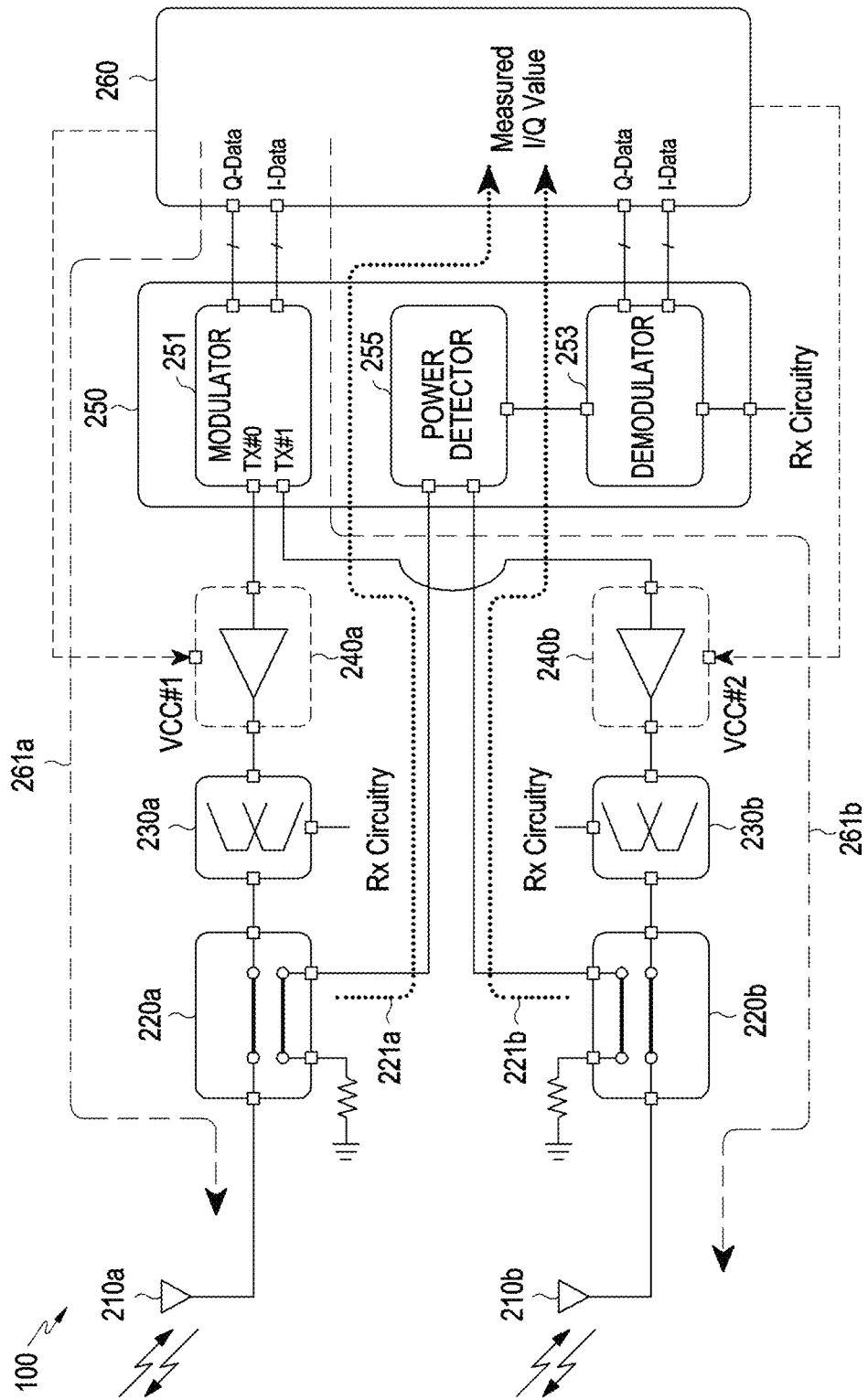
FIG. 2 is an exemplary circuit diagram illustrating a detailed structure of an electronic device according to various embodiments of the present disclosure.

FIG. 2 is an exemplary circuit diagram illustrating a detailed structure of an electronic device according to various embodiments of the present disclosure. Referring to FIG. 2, an electronic device 100 according to various embodiments may include at least one of a first antenna 210a, a second antenna 210b, a first coupler 220a, a second coupler 220b, a first duplexer 230a, a second duplexer 230b, a first power amplifier 240a, a second power amplifier 240b, a transceiver 250, and a processor 260. The transceiver 250 may include a modulator 251, a demodulator 253, and a power detector 255. In FIG. 2, reference symbols 261a and 261b denote transmission signal movement paths.

the transmission diversity system may include a plurality of antennas as illustrated in FIG. 2. Although FIG. 2 illustrates the transmission diversity system including two antennas for convenience of description, embodiments may be applied to a transmission diversity system having three or more antennas.

The electronic device 100 may receive transmission power parameters transmitted from the base station 120 through at least one of the plurality of antennas 210a and 210b and an RX circuitry. The processor 260 may calculate (or determine) target transmission power based on the received transmission power parameters.

When the target transmission power is equal to or higher than a predetermined power threshold (e.g., 18 dBm), the processor 260 of the electronic device 100 may generate a plurality of PCC signals for transmission diversity. The plurality of PCC signals generated by the processor 260 may be modulated through the modulator 251 of the transceiver 250 and may then be transmitted through a path connected to each antenna.

For example, a first transmission signal TX #0 (e.g., a first signal) output from the modulator 251 is amplified corresponding to power supply of VCC #1 through the first power amplifier 240a, and may be radiated in a wireless manner via the first duplexer 230a and the first coupler 220a and through the first antenna 210a. For example, a second transmission signal TX #1 (e.g., a second signal) output from the modulator 251 is amplified corresponding to the power supply of VCC #2 through the second power amplifier 240b, and may be radiated in a wireless manner via the second duplexer 230b and the second coupler 220b and through the second antenna 210b.

The processor 260 may determine the transmission power for each PCC signal transmitted through the plurality of antennas 210a and 210b based on the target transmission power. For example, the processor 260 may determine reference transmission power having the same value for a plurality of PCC signals by assuming a plurality of antennas having the same antenna gain. According to the determination of the reference transmission power, the processor 260 may control the first power amplifier 240a and the second power amplifier 240b with the same VCC voltage (VCC #1=VCC #2). For example, the process of transmitting the first PCC signal and the second PCC signal with the reference transmission power may be implemented in an LTE random access procedure, for example, through a PRACH preamble transmission process.

A plurality of PCC signals generated through the processor 260 are amplified to a VCC voltage corresponding to the reference transmission power through the first power amplifier 240a and the second power amplifier 240b, and may be transmitted to the base station 120 through the first antenna 210a (e.g., a first PCC antenna) and the second antenna 210b (e.g., a second PCC antenna).

As illustrated in FIG. 2, between respective antennas 210a and 210b and a transmission circuitry (e.g., the duplexers 230a and 230b or the power amplifiers 240a and 240b), the couplers 220a and 220b may be disposed, and the plurality of PCC signals may be fed back to the transceiver 250 or the processor 260 through the respective couplers 220a and 220b simultaneously with being output through the respective antennas 210a and 210b.

In the transceiver 250, the actual transmission power (e.g., analog transmission power) of the PCC signals output through the respective antennas 210a and 210b is measured through the power detector 255, and the PCC signals may be demodulated through the demodulator 253. FIG. 2 illustrates that the demodulator 253 demodulates the plurality of PCC signals measured from the power detector 255, and demodulates by receiving, through an RX circuitry, reception signals received from the antennas 210a and 210b. However, according to various embodiments, it is also possible to configure separate demodulators 253 so as to individually perform demodulation.

The processor 260 may measure I/Q values (e.g., digital values) for a plurality of demodulated PCC signals received from the transceiver 250. Based on the measured I/Q values, the electronic device 100 is capable of measuring impedance between the plurality of antennas and a free space, and is capable of determining an impedance change impedance with respect to the antennas (such as contact of a human body (e.g., a hand or a head) or connection of an accessory such as an earphone or a USB cable) in real time by measuring the I/Q values. According to various embodiments, the impedance measurement may not be synchronized to the downlink signal reception, but may be synchronized only to the uplink signal transmission.

According to various embodiments described below, the transmission power for the first antenna and the transmission power for the second antenna may be output by performing a phase correction by the processor 260. The phase difference between respective transmission signals may be minimized through the correction of the phase difference between a first transmission signal and a second transmission signal in the electronic device 100 supporting the BFTD.

According to various embodiments, an optimal transmission beam pattern can be generated by determining phase values for optimal beam-forming according to the respective antenna positions of the electronic device 100 and then reading a Reference Signals Received Power (RSRP) value of each antenna. In the electronic device 100 supporting the BFTD, it is possible to solve problems such as call dropping and muting, which are caused due to an antenna beam pattern deformation phenomenon caused due to occurrence of a phase difference between respective transmission signals, and a problem of outputting transmission power different from the request of the base station.

The phase of the transmission signal transmitted from a portable electronic device can be readjusted by measuring transmitted signal information using a combiner or a phase detector as in the description to be described later.

The electronic device may include: a housing; a first antenna (e.g., the first antenna 210a of FIG. 2A) located inside the housing or in a first portion on the housing; a second antenna (e.g., the second antenna 210b of FIG. 2B) located inside the housing or in a second portion on the housing to be spaced apart from the first portion of the housing; a transceiver (e.g., the transceiver 250 of FIG. 2) configured to generate a first signal and a second signal; a first coupler (e.g., the first coupler 220a of FIG. 2) electrically connected between the first antenna and the transceiver, and configured to receive the first signal from the transceiver and provide the first signal to the first antenna; a second coupler (e.g., the second coupler 220b of FIG. 2) electrically connected between the second antenna and the transceiver, and configured to receive the second signal from the transceiver and provide the second signal to the second antenna; and a control circuitry (e.g., the processor 260 of FIG. 2) operatively connected to the transceiver. The control circuitry may be configured to determine values associated with a phase difference between the first signal and the second signal at least partially based on the signals from the first coupler and the second coupler, and to cause the transceiver to adjust a phase of the first signal and/or a phase of the second signal using at least some of the values in order to reduce or remove the phase difference.

The electronic device may further include a communication processor including the control circuitry.

The electronic device may further include a combiner electrically connected to the first coupler, the second coupler, and the control circuitry.

The combiner may be configured to combine a signal fed back from the first coupler and a signal fed back from the second coupler so as to provide the combined signal to the control circuitry, and the control circuitry may be configured to determine whether or not the first signal and/or the second signal are phase-corrected based on the combined signal provided from the combiner.

The electronic device may further include a phase detector electrically connected to the first coupler, the second coupler, and the control circuitry.

The phase detector may be configured to determine a phase difference between the first signal and the second signal from a signal fed back from the first coupler and a signal fed back from the second coupler, and the control circuitry may be configured to determine whether or not the phase of the first signal and/or the phase of the second signal are phase-corrected based on the phase difference provided from the phase detector.

The first coupler and the second coupler may be disposed outside the transceiver.

The first coupler may be physically closer to the first antenna than the transceiver and the second coupler may be physically closer to the second antenna than the transceiver.

The electronic device includes a first electrical path between the transceiver and the first coupler and a second electrical path between the transceiver and the second coupler. The first path and the second path may have different lengths.

The housing may further include a side member including a first conductive portion provided as the first antenna and a second conductive portion provided as the second antenna.

The control circuitry may be configured to generate the first signal and the second signal in order to provide transmission diversity.

The first signal and the second signal may be Primary Carrier Component (PCC) signals having the same frequency.

The control circuitry may be configured to generate the first signal and the second signal in order to provide beamforming.

Figure 3:
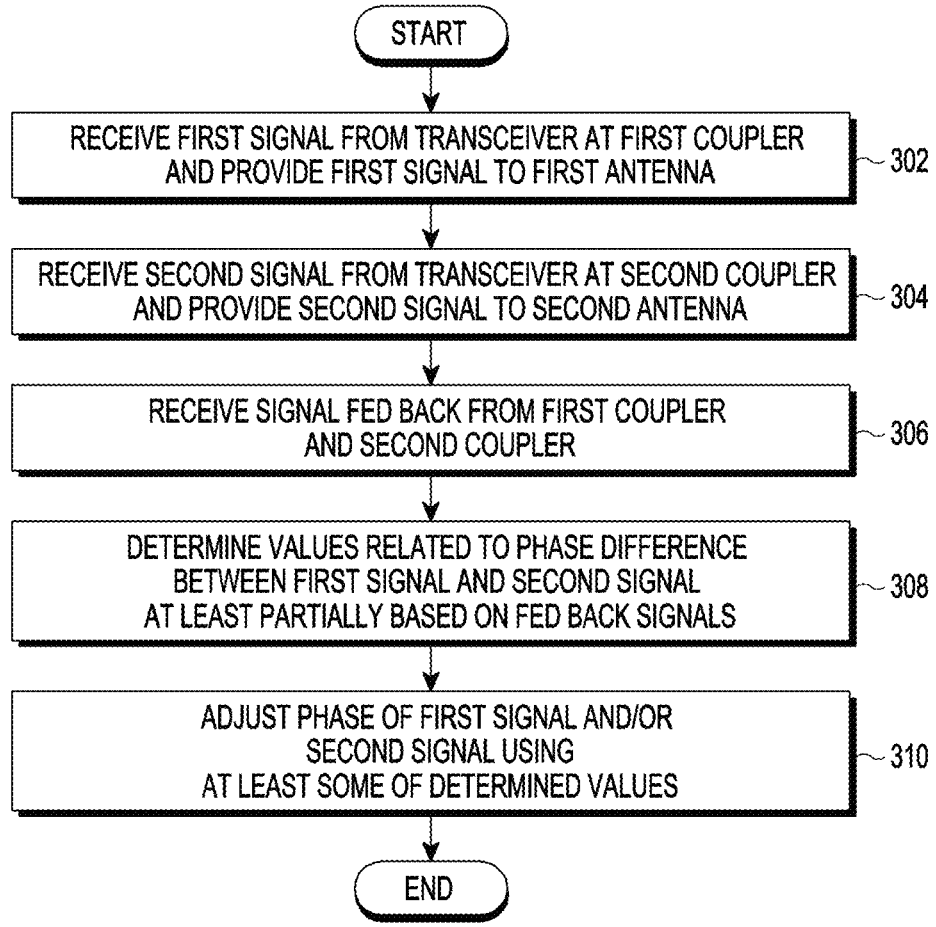
FIG. 3 is an exemplary flowchart illustrating a transmission diversity phase correction method in an electronic device according to various embodiments of the present disclosure.

FIG. 3 is a flowchart illustrating a transmission diversity phase correction method in an electronic device according to various embodiments. Referring to FIG. 3, at operation 302, an electronic device (e.g., the electronic device 100 of FIG. 1 or FIG. 2) may receive a first signal (e.g., a first PCC signal) from the transceiver (e.g., the transceiver 250 of FIG. 2) at the first coupler (e.g., the first coupler 220a of FIG. 2), and may provide the first signal to the first antenna (e.g., the first antenna 210a of FIG. 2).

At operation 304, the electronic device (e.g., the electronic device 100 of FIG. 1 or FIG. 2) may receive a second signal (e.g., a second PCC signal) from the transceiver (e.g., the transceiver 250 of FIG. 2) at the second coupler (e.g., the second coupler 220b of FIG. 2) and may provide the second signal to the second antenna (e.g., the second antenna 210b of FIG. 2). The operations 302 and 304 may be performed simultaneously or sequentially. At operation 306, the electronic device 100 (e.g., the processor 260 of FIG. 2) may receive signals fed back from the first coupler and the second coupler.

At operation 308, the electronic device 100 (e.g., the processor 260 of FIG. 2) may determine a value associated with a phase difference between the first signal and the second signal at least partially based on the signals fed back from the first coupler and the second coupler. At operation 310, electronic device 100 (e.g., processor 260 of FIG. 2) may adjust the phase of the first signal and/or the second signal using at least some of the values associated with the phase difference.

In a method of operating an electronic device according to any one of various embodiments, a transmission diversity phase correction method in the electronic device may include: receiving a first signal at a first coupler (e.g., the first coupler 220a of FIG. 2) electrically connected between a first antenna (e.g., the first antenna 210a of FIG. 2) and a transceiver (e.g., the transceiver 250 of FIG. 2) from the transceiver and providing the first signal to the first antenna; receiving a second signal at a second coupler (e.g., the second coupler 220b of FIG. 2) electrically connected between a second antenna (e.g., the second antenna 210b of FIG. 2) and a transceiver from the transceiver and providing the second signal to the second antenna; receiving signals fed back from the first coupler and the second coupler; determining values associated with a phase difference between the first signal and the second signal at least partially based on the fed back signals; and causing the transceiver to adjust a phase of the first signal and/or a phase of the second signal using at least some of the values in order to reduce or remove the phase difference.

The method may further include combining a signal fed back from the first coupler and a signal fed back from the second coupler; and determining whether or not a phase difference between transmission signals is corrected based on the combined signal.

When an amplitude of the combined signal corresponds to a predetermined magnitude, it may be determined that the phases of the transmission signals coincide with each other.

The method may further include determining a phase difference between the first signal and the second signal from the signal fed back from the first coupler and the signal fed back from the second coupler, and determining whether or not the phase difference between transmission signals is corrected based on the phase difference.

When the phase difference is equal to or less than a predetermined value, it may be determined that the phases of the transmission signals coincide with each other.

The method may further include generating the first signal and the second signal in order to provide transmission diversity.

The first signal and the second signal may be Primary Carrier Component (PCC) signals having the same frequency.

Figure 4:
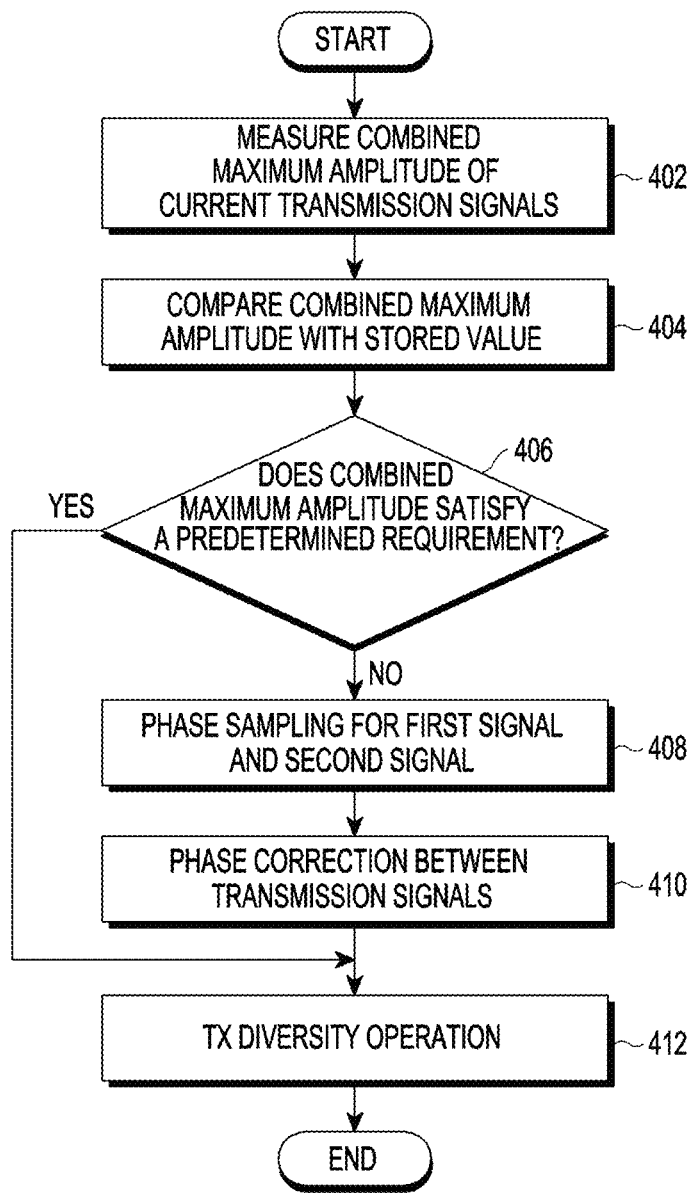
FIG. 4 is an exemplary flowchart illustrating a transmission diversity phase correction method in an electronic device according to various embodiments of the present disclosure.

FIG. 4 is an exemplary flowchart illustrating a transmission diversity phase correction method in an electronic device according to various embodiments of the present disclosure. In a product manufacturing process, as a preliminary step, an electronic device (e.g., the electronic device 100 of FIG. 1 or 2) may measure a maximum amplitude for each phase difference of the combined signal for the first and second signals, and may store an Analog to Digital Converting (ADC) value corresponding to the maximum amplitude.

At operation 402, an electronic device (e.g., the electronic device 100 of FIG. 1 or 2) may combine the signals fed back from the first coupler and the second coupler and may measure the combined maximum amplitude of the transmission signals, which are currently transmitted.

At operation 404, the electronic device (e.g., the electronic device 100 of FIG. 1 or FIG. 2) may compare the maximum combined amplitude to a stored value. At operation 406, when it is determined that the maximum combined amplitude satisfies a predetermined requirement as the result of the above-mentioned comparison, at operation 412, the electronic device (e.g., the electronic device 100 of FIG. 1 or FIG. 2) may determine that the phases of the first signal and the second signal currently coincide with each other and may operate transmission diversity.

At operation 406, when it is determined that the maximum combined amplitude does not satisfy a predetermined requirement, at operation 408, the electronic device (e.g., the electronic device 100 of FIG. 1 or FIG. 2) may sample phases for the first signal and the second signal. At operation 410, the electronic device (e.g., the electronic device 100 of FIG. 1 or FIG. 2) may correct the phase difference between the first signal and the second signal. At operation 412, the electronic device (e.g., the electronic device 100 of FIG. 1 or FIG. 2) may perform transmission diversity with the phase-corrected transmission signals.

Figure 5:
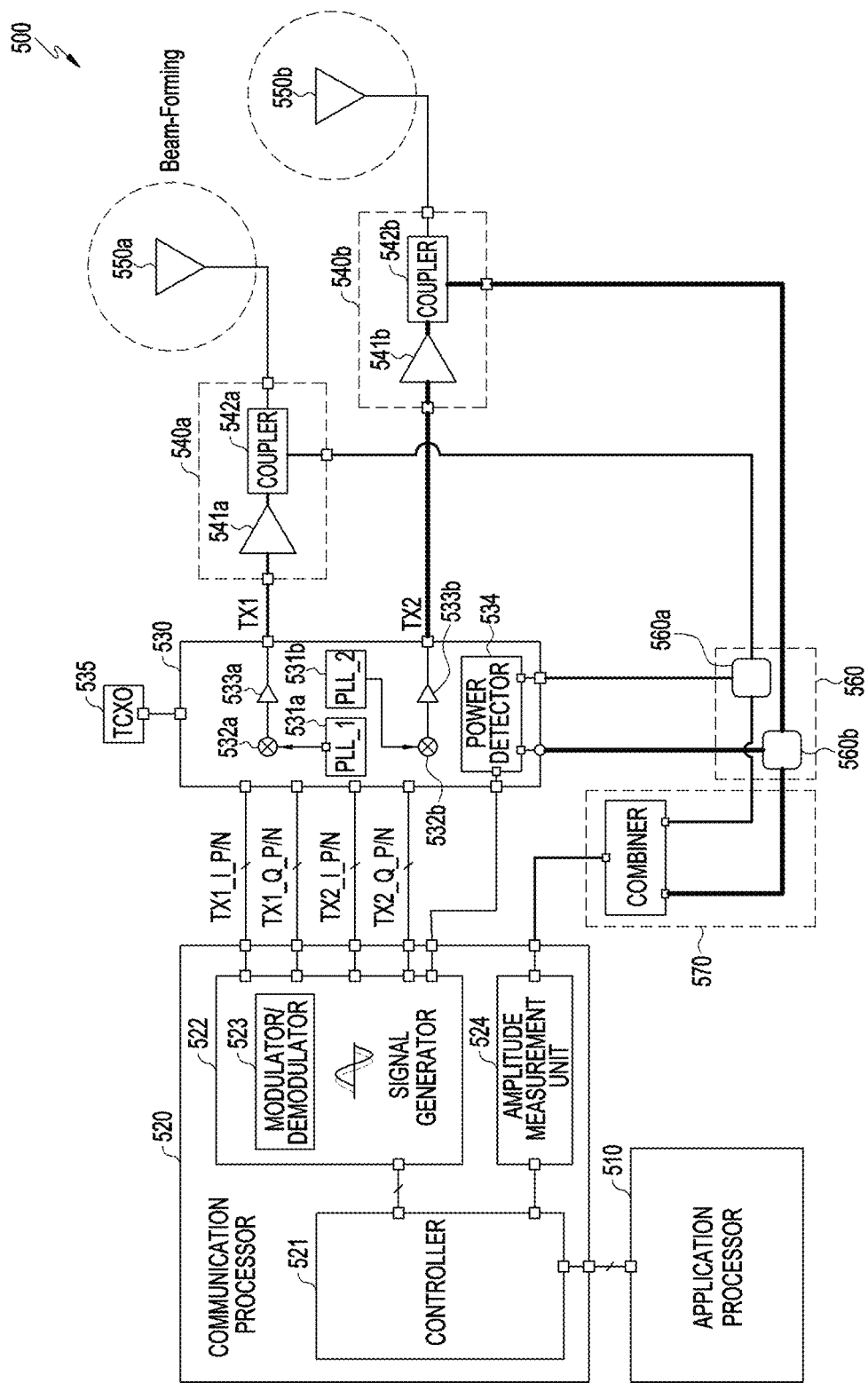
FIG. 5 is an exemplary circuit diagram illustrating a detailed structure of an electronic device according to various embodiments of the present disclosure.

FIG. 5 is a circuit diagram illustrating a detailed structure of an electronic device according to various embodiments. Referring to FIG. 5, an electronic device 500 according to various embodiments may include an application processor 510, a communication processor 520, a transceiver 530, a first transmission circuitry 540a, a second transmission circuitry 540b, a first antenna 550a, a second antenna 550b, a first divider 560a, a second divider 560b, and a combiner 570. The electronic device 500 of FIG. 5 may be similar to or the same as the electronic device 100 of FIG. 1 or FIG. 2.

The communication processor 520 may include a signal generator 522 including a controller 521 (or a control circuitry) and a modulator/demodulator 523, and an amplitude measurement unit 524.

The transceiver 530 may receive a frequency signal from a Temperature-Compensated Crystal Oscillator (TCXO) 535 and may output a first signal TX1 and a second signal TX2. The transceiver 530 may combine a PLL_1 signal 531a with a signal provided from the communication processor 520 by a first mixer 532a and may output a signal amplified through a first amplifier 533a. The transceiver 530 may combine a PLL_2 signal 531b with a signal provided from the communication processor 520 by a second mixer 532b and may output a signal amplified through a second amplifier 533b.

The first transmission circuitry 540a may include a first power amplifier 541a and a first coupler 542a. The first transmission circuitry 540a amplifies the first signal TX1 received from the transceiver 530 with a predetermined gain by the first power amplifier 541a and transmits the amplified signal to the first antenna 550a through the first coupler 542a. The second transmission circuitry 540b may include a second power amplifier 541b and a second coupler 542b. The second transmission circuitry 540a amplifies the second signal TX2 received from the transceiver 530 with a predetermined gain by the second power amplifier 541b and transmits the amplified signal to the second antenna 550b through the second coupler 542b.

According to various embodiments, the first signal transmitted through the first coupler 542a may be fed back to the first divider 560a, and the second signal transmitted through the second coupler 542b may be fed back to the second divider 560b. The first divider 560a may divide the signal fed back and received from the first coupler 542a and may provide divided signals to the combiner 570 and a power detector 534 of the transceiver 530. The second divider 560a may divide the signal fed back and received from the second coupler 542b and provide divided signals to the combiner 570 and the power detector 534 of the transceiver 530.

According to various embodiments, the combiner 570 may receive the first signal and the second signal, which are fed back from the first divider 560a and the second divider 560b, respectively, and may combine the two received signals. The signal combined through the combiner 570 may be provided to the amplitude measurement unit 524 of the communication processor 520. According to various embodiments, the amplitude measurement unit 524 may measure the amplitude of the combined signal received from the combiner 570, and provide the measurement result to the controller 521. The controller 521 may determine whether the phases of the two transmission signals (e.g., the first signal and the second signal), which are currently transmitted, coincide with each other based on the measurement result. According to various embodiments, when it is determined that the phases coincide with each other as the result of measurement, the signals can be transmitted to the plurality of antennas 550a and 550b by transmission diversity. When it is determined that the phases do not coincide with each other as the result of measurement, optimal beam-forming cannot be provided. Thus, the phase of any one of the first signal and the second signal may be fixed and the phase of the other signal may be gradually shifted so as to repeatedly perform the measurement described above. When it is determined that the phases coincide with each other as the result of repeatedly performing the measurement, a signal according to the transmit diversity may be transmitted with the corresponding phase.

According to various embodiments, phase correction may be provided by the combiner 570 as illustrated in FIG. 5. The electronic device 500 of FIG. 5 supports the BFTD function, and according to various embodiments, the phase of each transmission signal may be corrected using the combiner 570. According to various embodiments, in the embodiment of FIG. 5, the combined amplitudes of respective transmission signals may be calculated to correct the phases thereof.

According to various embodiments, the communication processor 520 may combine (e.g., sum) the amplitudes of the first and second signals through the amplitude measurement unit 524 so as to determine whether a phase difference between the transmission signals is in the optimal state. According to various embodiments, the electronic device 500 may perform a phase correction function on a transmission signal to be processed by the transceiver 530 through arithmetic processing using a Digital Signal Processor (DSP) within the communication processor 520. According to various embodiments, the electronic device 500 may transmit each transmission signal after changing the phase thereof using the signal generator 522. The phase of the transmission signal to be transmitted to the transceiver (e.g., an RFIC) may be controlled through the phase change by the communication processor 520.

The transceiver 530 processes transmission feedback signals fed back from the couplers 542a and 542b as baseband signals by changing the frequencies thereof using an internal Local Oscillator (LO) of the communication processor 520. According to various embodiments, the power detector 534 of the transceiver 530 may convert the magnitude of the signal of transmission power into a digital signal by an ADC and may transmit the digital signal to the communication processor 520. Each of the couplers 542a and 542b may perform functions of attenuating a signal, amplified through each of the power amplifiers 541a and 541b connected thereto, into a small signal and of feeding back the small signal so as to be processed by the transceiver 530, and the combiner 570 is capable of performing a function of combining respective transmission signals fed back from the respective couplers 542a and 542b.

Hereinafter, with reference to FIG. 6, FIG. 7, and FIG. 8, the phase correction procedure through the circuitry of FIG. 5 will be described in detail.

Figure 6:
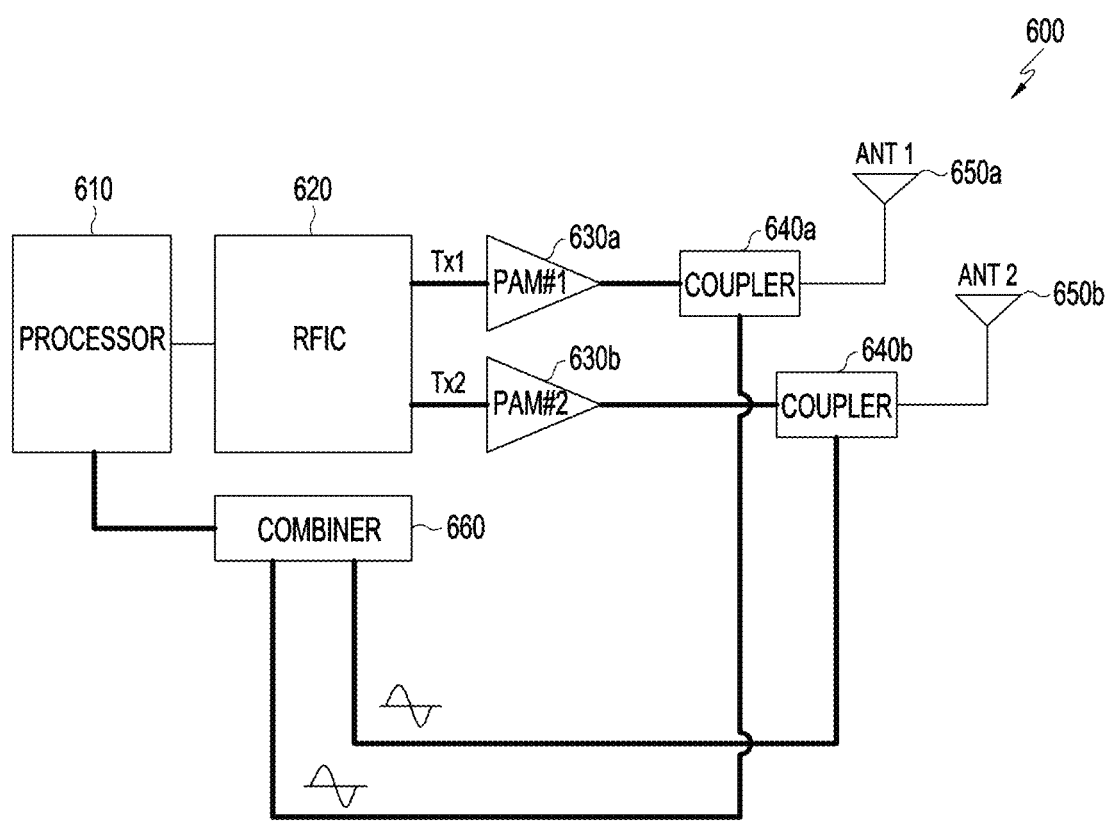
FIG. 6 is an exemplary circuit diagram illustrating a detailed structure of an electronic device according to various embodiments of the present disclosure.

FIG. 6 is a circuit diagram illustrating a detailed structure of an electronic device according to various embodiments. Referring to FIG. 6, an electronic device 600 (e.g., the electronic device 100 of FIG. 1 or the electronic device 500 of FIG. 5) according to various embodiments may include a processor 610 (e.g., the communication processor 520 of FIG. 5), a transceiver 620 (e.g., the transceiver 530 of FIG. 5), a first power amplifier 630a (e.g., the first power amplifier 541a of FIG. 5), a second power amplifier 630b (e.g., the second power amplifier 541b of FIG. 5), a first coupler 640a (e.g., the first coupler 542a of FIG. 5), a second coupler 640b (e.g., the second coupler 542b of FIG. 5), a first antenna 650a (e.g., the first antenna 550a of FIG. 5), a second antenna 650b (e.g., the second antenna 550b of FIG. 5), and a combiner 660 (e.g., the combiner 570 of FIG. 5). Since each of the above-described components is capable of performing the same or similar function as a component having the same name in FIG. 5, a detailed description will be omitted.

According to various embodiments, FIG. 6 illustrates a step of generating reference data for a phase correction operation. The procedure illustrated in FIG. 6 may be performed in advance in a manufacturing process of the electronic device 600 for transmission phase tuning during the use of the electronic device 600. For example, in the state in which the phase of the first transmission signal Tx1 is fixed, the phase of the second transmission signal Tx2 may be moved (e.g., shifted) by a specific interval, and a value (an ADC value) obtained by combining the first transmission signal and the second transmission signal Tx2 through the combiner 660 may be measured and stored. The measured signals may be stored in a table format as in Table 1 below.

TABLE 1

| Tx2 Phase | Sum of magnitudes of Tx1 and Tx2 (ADC value) |
| --- | --- |
| 0 | 150 |
| 10 | 130 |
| 20 | 120 |
| 30 | 110 |
| ... | ... |

According to various embodiments, the two transmission signals may be transmitted with the same magnitude, and a phase interval between the two signals may be predetermined. A reference value for the phase correction progress may be obtained by the above procedure according to various embodiments. According to various embodiments, the accuracy of a transmit diversity function can be improved by the above procedure.

According to various embodiments, in the process of FIG. 6, after generating dummy signals having the same magnitudes as the first transmission signal and the second transmission signal, which are used at the time of generating a value obtained by combining the first transmission signal and the second transmission signal through the combiner 660 (e.g., an ADC value), a relative phase between the two signals may be set to 0, and then the generated signals may be transmitted.

The electronic device may calculate a combined amplitude value of the two signals transmitted to the combiner 660 through the couplers 640a and 640b. It is possible to check whether the corresponding value is the same as the ADC value measured in the process of FIG. 6 (e.g., the value when the phase of the second transmission signal is 0 degrees). When it is determined that the corresponding value is the same as the ADC value measured as the result of the check, it is determined that a random phase error does not occur, and a transmission diversity process of actual user data can be started. When it is determined that the corresponding value is not the same as the ADC value measured as the result of the check, the dummy signals may be utilized to perform the phase correction process according to various embodiments.

According to various embodiments, the electronic device 600 may perform check as to whether the combined amplitude value of the two transmitted signals are the same as the maximum amplitude measured during the process, in the state in which wireless channels are occupied during the communication mode of a Radio Resource Controller (RRC) protocol. For example, the electronic device 600 may perform at least one operation according to various embodiments whenever the first data is transmitted after entering a CELL_DCH communication mode in which general data transmission is in progress.

Figure 7:
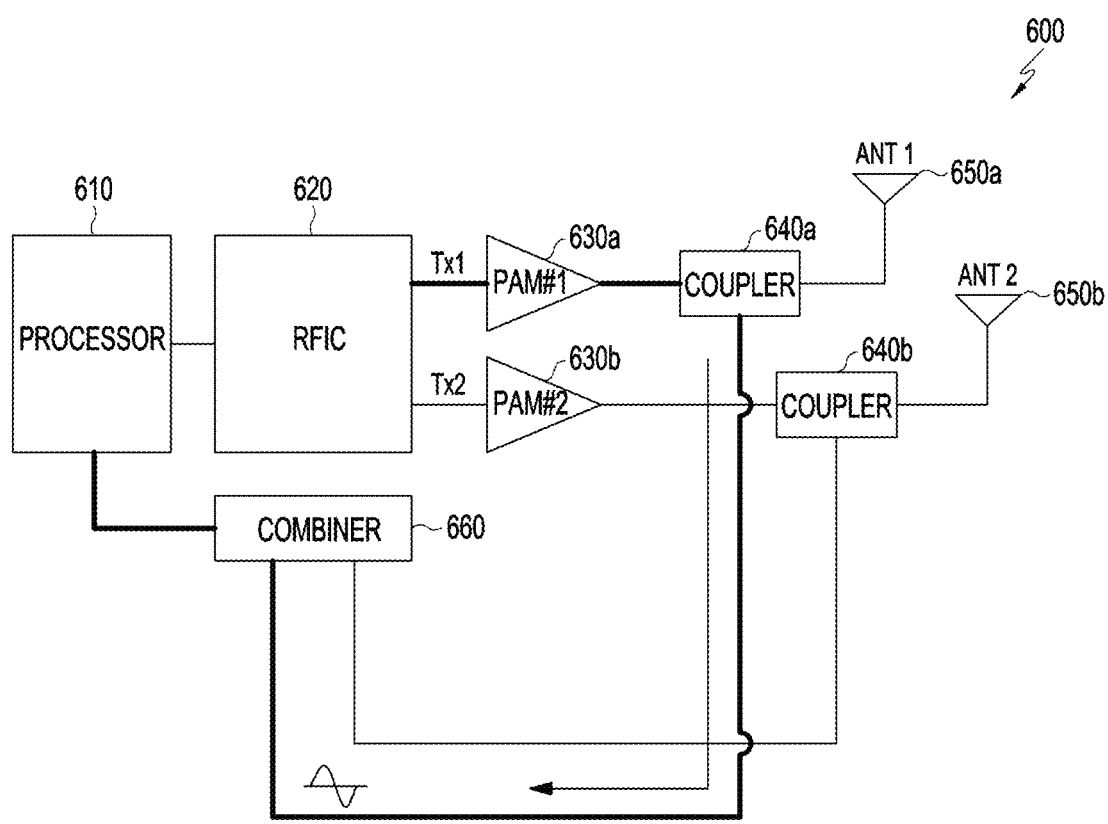
FIG. 7 is an exemplary circuit diagram illustrating a detailed structure of an electronic device according to various embodiments of the present disclosure.
Figure 8:
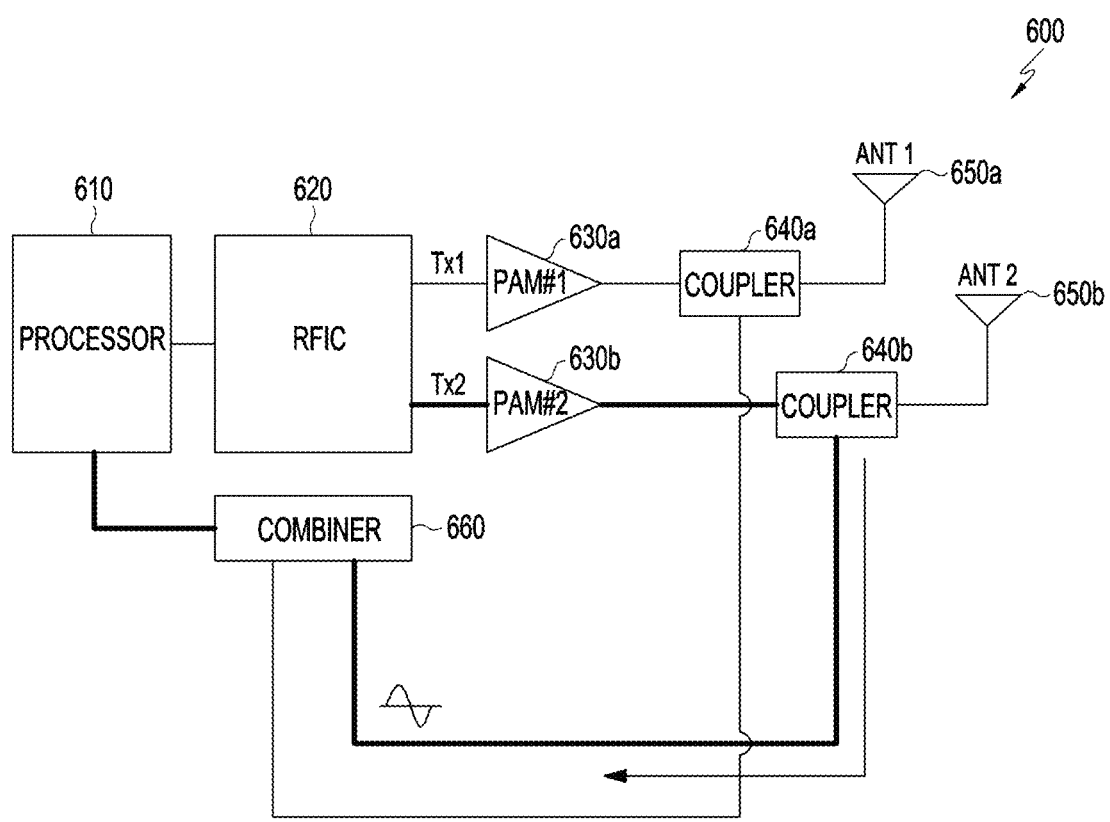
FIG. 8 is an exemplary circuit diagram illustrating a detailed structure of an electronic device according to various embodiments of the present disclosure.

FIG. 7 illustrates the phase sampling step of the first transmission signal, and FIG. 8 illustrates the phase sampling step of the second transmission signal.

According to various embodiments, referring to FIG. 7, the electronic device 600 may fix the phase of the first transmission signal to 0 degrees and may also fix the power in order to set the phase of a reference signal for phase correction.

The size of the first transmission signal may be the same as the size of the first transmission signal used in generating the ADC value in a process step, irrespective of the calculation result of Physical Uplink-Shared CHannel (PUSCH) power. For example, since the sizes of the first transmission signal and the second transmission signal transmitted in accordance with an actual network situation may be fluidly changed, signals having the same sizes as the first transmission signal and the second transmission signal used in the first generation of the ADC value in the process step may be used. According to various embodiments, the electronic device 600 may at least partially sample and store the first transmission signal fed back through the first coupler 640*a* via the first power amplifier 630*a*.

Referring to FIG. 8, a procedure for sampling the phase of the second transmission signal is performed is illustrated, in which the second transmission signal may be transmitted while shifting the phase of the second transmission signal from 0 to 360 degrees in a predetermined unit of phase (e.g. a unit of 10 degrees). The transmission signals corresponding to the respective phases may be fed back through the second coupler 640*b*, and the signals fed back thereby may be at least partially sampled and stored.

The size of the second transmission signal may be the same as the size of the second transmission signal used in generating the ADC value in a process step, irrespective of the calculation result of PUSCH power. For example, since the sizes of the first transmission signal and the second transmission signal transmitted in accordance with an actual network situation may be fluidly changed, signals having the same sizes as the first transmission signal and the second transmission signal used in the first generation of the ADC value in the process step may be used. According to various embodiments, the electronic device 600 may at least partially sample and store the second transmission signal fed back through the second coupler 640*b* via the second power amplifier 630*b*.

According to various embodiments, the sampled signal may be combined with the sampled signal of the first transmission signal, which has been extracted in the previous step, and the phase value of the second transmission signal having the largest value may be stored in the memory of the electronic device 600.

The electronic device 600 may determine the combined value of the first transmit signal and the second transmit signal through the combiner 660 based on the second transmission signal stored in the memory for phase correction. According to various embodiments, it is possible to determine the summed amplitude value of amplitudes of the two signals stored in advance during the process of FIG. 5, and to determine whether the summed amplitude value has the largest value among the measured values. When it is determined that the sum does not have the largest value, the phase of the second transmission signal may be finely adjusted.

According to various embodiments, the finely tuned phase adjustment unit may be set to a value less than the phase shift value (e.g., 10 degrees) used in the sampling step of the first transmission signal and the second transmission signal. After the fine adjustment, and after the phase having the largest value is found and stored in a temporary memory, the processor 610 may perform phase error correction by [360-phase]. According to various embodiments, after the phase correction operation or after the random phase error non-occurrence determination operation, uplink transmission diversity in the real network may be performed using the user's data.

According to various embodiments, the electronic device 600 may determine the summed power value of the two signals previously stored during the process of FIG. 5, and may determine whether the largest value of the measured values satisfies a predetermined condition (e.g., whether it is equal to or greater than a first reference value (e.g., the minimum value of a communicable level) or within a predetermined error range). When it is determined that the largest value of the measured values is equal to or less than the first reference value, since it is difficult to perform normal communication even with phase correction, the phase correction procedure can be started again from the initial stage.

Figure 9:
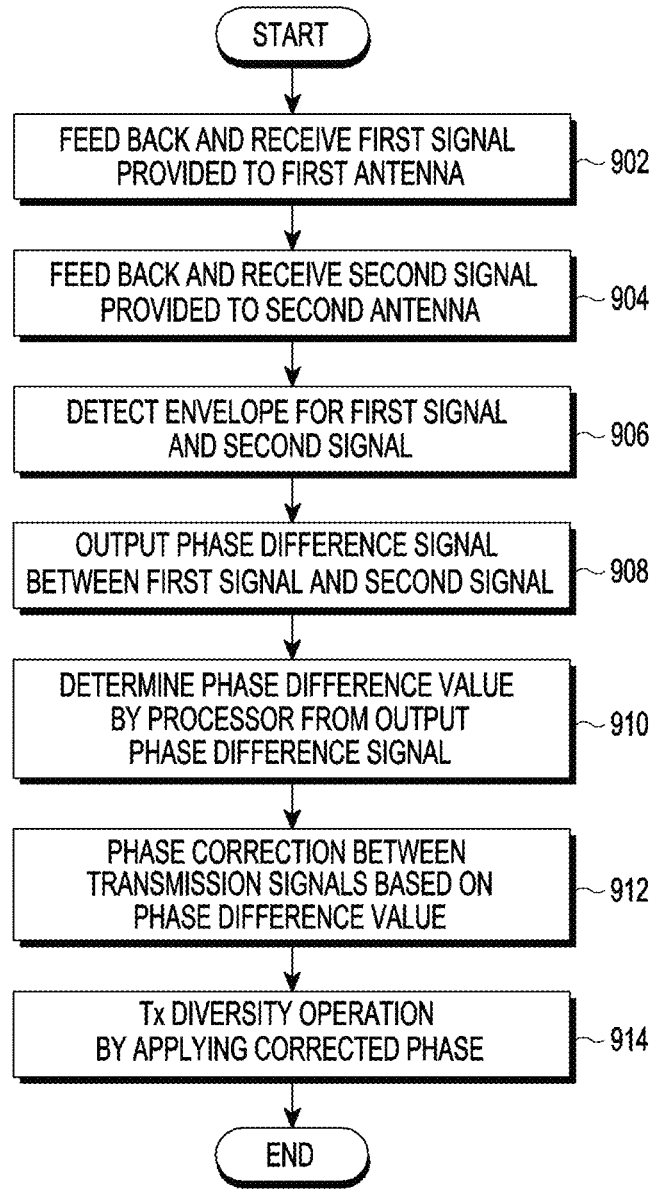
FIG. 9 is an exemplary flowchart illustrating a transmission diversity phase correction method in an electronic device according to various embodiments of the present disclosure.

FIG. 9 is a flowchart illustrating a transmission diversity phase correction method in an electronic device according to various embodiments. Referring to FIG. 9, an electronic device (e.g., the electronic device 100 of FIG. 1 or FIG. 2) may receive a first signal (e.g., a first PCC signal) from the transceiver (e.g., the transceiver 250 of FIG. 2) at the first coupler (e.g., the first coupler 220*a* of FIG. 2), and may provide the first signal to the first antenna (e.g., the first antenna 210*a* of FIG. 2). In addition, the electronic device may receive a second signal (e.g., a second PCC signal) from the transceiver (e.g., the transceiver 250 of FIG. 2) at the second coupler (e.g., the second coupler 220*b* of FIG. 2) and may provide the second signal to the second antenna (e.g., the second antenna 210*b* of FIG. 2).

At operation 902, the electronic device (e.g., the electronic device 100 of FIG. 1 or FIG. 2) may feed back and receive the first signal, provided to the first antenna, through the first coupler. At operation 904, the electronic device (e.g., the electronic device 100 of FIG. 1 or FIG. 2) may feed back and receive the second signal, provided to the second antenna, through the second coupler.

At operation 906, the electronic device (e.g., the electronic device 100 of FIG. 1 or FIG. 2) may detect envelops for the first signal and the second signal fed back as described above. At operation 908, the electronic device (e.g., the electronic device 100 of FIG. 1 or FIG. 2) may output a phase difference signal between the first signal and the second signal through the phase detector.

At operation 910, the electronic device (e.g., the electronic device 100 of FIG. 1 or FIG. 2) may determine a phase difference value from the output phase difference signal by the processor. At operation 912, the electronic device (e.g., the electronic device 100 of FIG. 1 or FIG. 2) may correct the phase difference between the transmission signals.

At operation 914, the electronic device (e.g., the electronic device 100 of FIG. 1 or FIG. 2) may perform transmission diversity by applying the corrected phase.

Figure 10:
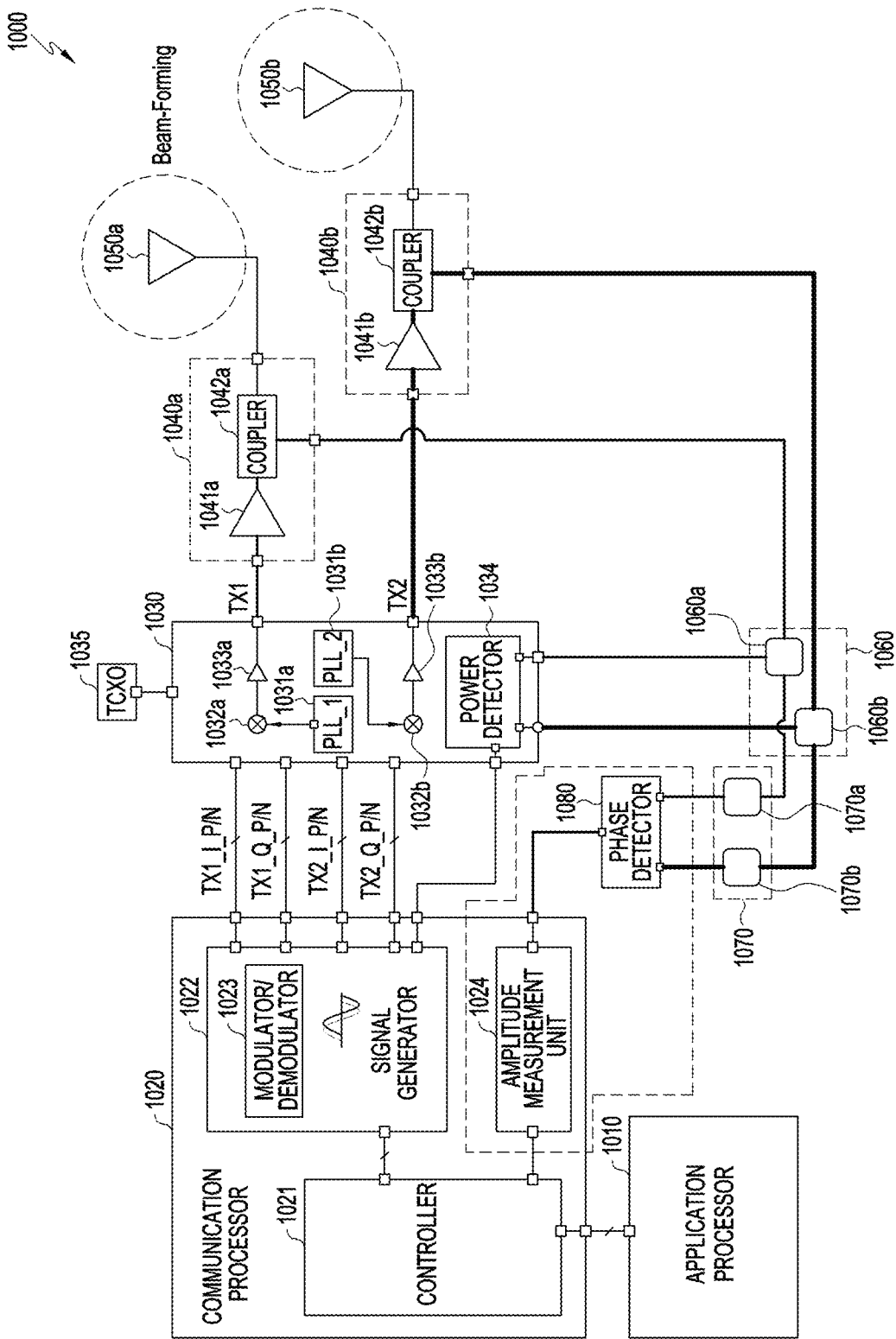
FIG. 10 is an exemplary circuit diagram illustrating a detailed structure of an electronic device according to various embodiments of the present disclosure.

FIG. 10 is a circuit diagram illustrating a detailed structure of an electronic device according to various embodiments. Referring to FIG. 10, an electronic device 1000 according to various embodiments may include an application processor 1010, a communication processor 1020, a transceiver 1030, a first transmission circuitry 1040a, a second transmission circuitry 1040b, a first antenna 1050a, a second antenna 1050b, a first divider 1060a, a second divider 1060b, a first envelope detector 1070a, a second envelope detector 1070b, and a phase detector 1080. The electronic device 1000 of FIG. 10 may be similar to or the same as the electronic device 100 of FIG. 1 or FIG. 2.

The communication processor 1020 may include a signal generator 1022 including a controller 1021 (or a control circuitry) and a modulator/demodulator 1023, and a phase measurement unit 1024.

The transceiver 1030 may receive a frequency signal from a Temperature-Compensated Crystal Oscillator (TCXO) 1035 and may output a first signal TX1 and a second signal TX2. The transceiver 1030 may combine a PLL_1 signal 1031a with a signal provided from the communication processor 1020 by a first mixer 1032a and may output a signal amplified through a first amplifier 1033a. The transceiver 1030 may combine a PLL_2 signal 1031b with a signal provided from the communication processor 1020 by a second mixer 1032b and may output a signal amplified through a second amplifier 1033b.

The first transmission circuitry 1040a may include a first power amplifier 1041a and a first coupler 1042a. The first transmission circuitry 1040a amplifies the first signal TX1 received from the transceiver 1030 with a predetermined gain by the first power amplifier 1041a and transmits the amplified signal to the first antenna 1050a through the first coupler 1042a. The second transmission circuitry 1040b may include a second power amplifier 1041b and a second coupler 1042b. The second transmission circuitry 1040b amplifies the second signal TX2 received from the transceiver 1030 with a predetermined gain by the second power amplifier 1041b and transmits the amplified signal to the second antenna 1050b through the second coupler 1042b.

The first signal transmitted through the first coupler 1042a may be fed back to the first divider 1060a, and the second signal transmitted through the second coupler 1042b may be fed back to the second divider 1060b. The first divider 1060a may divide the signal fed back and received from the first coupler 1042a and may provide divided signals to the first envelope detector 1070a and a power detector 1034 of the transceiver 1030. The second divider 1060b may divide the signal fed back and received from the second coupler 1042b and may provide divided signals to the second envelope detector 1070b and the power detector 1034 of the transceiver 1030.

The first envelope detector 1070a may detect the envelope of the first signal fed back as described above and may provide the envelope to the phase detector 1080. The second envelope detector 1070b may detect the envelope of the second signal fed back as described above and may provide the envelope to the phase detector 1080. The phase detector 1080 may receive the output signal of the first envelope detector 1070a and the output signal of the second envelope detector 1070b and may output a phase difference signal between the two signals. The output signal of the phase detector 1080 may be provided to the phase measurement unit 1024 of the communication processor 1020.

The phase measurement unit 1024 may determine a phase difference value between the two signals from the provided phase difference signal. The controller 1021 of the communication processor 1020 may correct the phase difference between the transmission signals based on the determined phase difference value.

In one embodiment, the electronic device 1000 of FIG. 10 supports the BFTD function, and according to various embodiments, the phase of each transmission signal may be corrected using the phase detector 1080. Referring to FIG. 10, according to various embodiments, the operation of correcting the phases of respective transmission signals using the phase detector 1080 in the electronic device 1000 may be performed in the state in which wireless channels are occupied during the communication mode of a Radio Resource Controller (RRC) protocol. For example, the electronic device 1000 may perform the operation of correcting the phase of each transmission signal whenever the first data is transmitted after entering a CELL_DCH communication mode in which general data transmission is in progress.

After the first transmission signal and the second transmission signal output from the transceiver 1030 pass through couplers 1042a and 1042b that branch the respective signals, a divider 1060 that blocks retrogression of signals and distributes the signals, and an envelope detector 1070 that detects the envelope of a frequency signal, a phase difference between two input transmission signals may be detected in the phase detector 1080.

The phase measurement unit 1024 in the communication processor 1020 may calculate the phase difference between the first transmission signal and the second transmission signal through an arithmetic calculation process, and may output a signal while adjusting the phase of each of the transmission signals at least based on the calculated result.

As a more specific example, the phase detector 1080 may determine the phase difference between the first transmission signal and the second transmission signal, which are analog signals transmitted through the couplers 1042a and 1042b and the envelope detector 1070, and may detect a digital signal. For example, the phase detector 1080 may output XOR clock signal data for a phase difference between the first transmission signal and the second transmission signal. According to various embodiments, the output XOR clock signal data may be transmitted by being generated in the phase measurement unit 1024 in the communication processor 1020. The envelope detector 1070 connected to the phase detector 1080 in FIG. 10 may detect the envelope of an original transmission signal from which a carrier frequency component is removed, from the modulated signal.

The phase measurement unit 1024 may calculate the phase difference between the first transmission signal and the second transmission signal based on the ADC signal for the phase difference between the first transmission signal and the second transmission signal transmitted from the phase detector 1080. According to various embodiments, the value of the phase difference result between the first transmission signal and the second transmission signal, calculated from the phase measurement unit 1024, may be transmitted to a Digital Signal Processor (DSP) in the communication processor 1020, and the electronic device 1000 may perform a phase correction function on a transmission signal to be processed by the transceiver 1030 through an arithmetic process using the DSP in the communication processor 1020. According to various embodiments, the electronic device 1000 may transmit each transmission signal after changing the phase thereof using the signal generator 1022. The phase of the transmission signal to be transmitted to the transceiver (e.g., an RFIC) may be controlled through the phase change by the communication processor 1020.

A scenario using the phase detector 1080 will be described in detail below. Hereinafter, descriptions will be made assuming that the electronic device 1000 uses BFTD algorithm 2 among BFTD algorithms.

1. The algorithm is based on combined TPC.
2. A phase offset δ may be 48 degrees, and a may be 12 degrees.
3. Let TPC command DOWN be represented by −1 and TPC command UP by +1.
   a. With respect to a first slot (#1 slot), between two transmitters, an initial relative phase Δφ=−δ/2, and ε is kept as 0 until two TPC commands become available to a UE.
   b. For the next slot, a relative phase, Δφ=Δφ+δ, is applied.
   c. A new relative phase is determined.
      i. When TPC1>TPC2, Δφ=Δφ+ε
      ii. When TPC2>TPC1, Δφ=Δφ−ε
      iii. No other change
      Note: TPC1 and TPC2 correspond to slots (1, 2), (3, 4), . . . , (i*2−1, i*2). i=1 to n
   d. For the next slot, a relative phase, Δφ=Δφ−δ, is applied.
   e. Move to step b Main features of the algorithm are as follows.

1. In the case of the first slot, the relative phase between the first transmission signal and the second transmission signal (a phase difference between the two signals)=−24 degrees.
2. In the case of the second slot, the relative phase between the first transmission signal and the second transmission signal (a phase difference between the two signals) =+24 degrees.
3. In the case of the third slot:
   when TPC1>TPC2, the relative phase between the first transmission signal and the second transmission signal (a phase difference between the two signals)=−12;
   when TPC1<TPC2, the relative phase between the first transmission signal and the second transmission signal (a phase difference between the two signals)=−36; and/or
   when TPC1==TPC2, the relative phase between the first transmission signal and the second transmission signal (a phase difference between the two signals)=−24 degrees.

After the connection attempt with the network to transmit the user's data from the electronic device, the RRC state (the communication mode of the RRC protocol) may be switched into the Cell_DCH, which is the state in which general data transmission is performed by occupying wireless channels.

Figure 11:
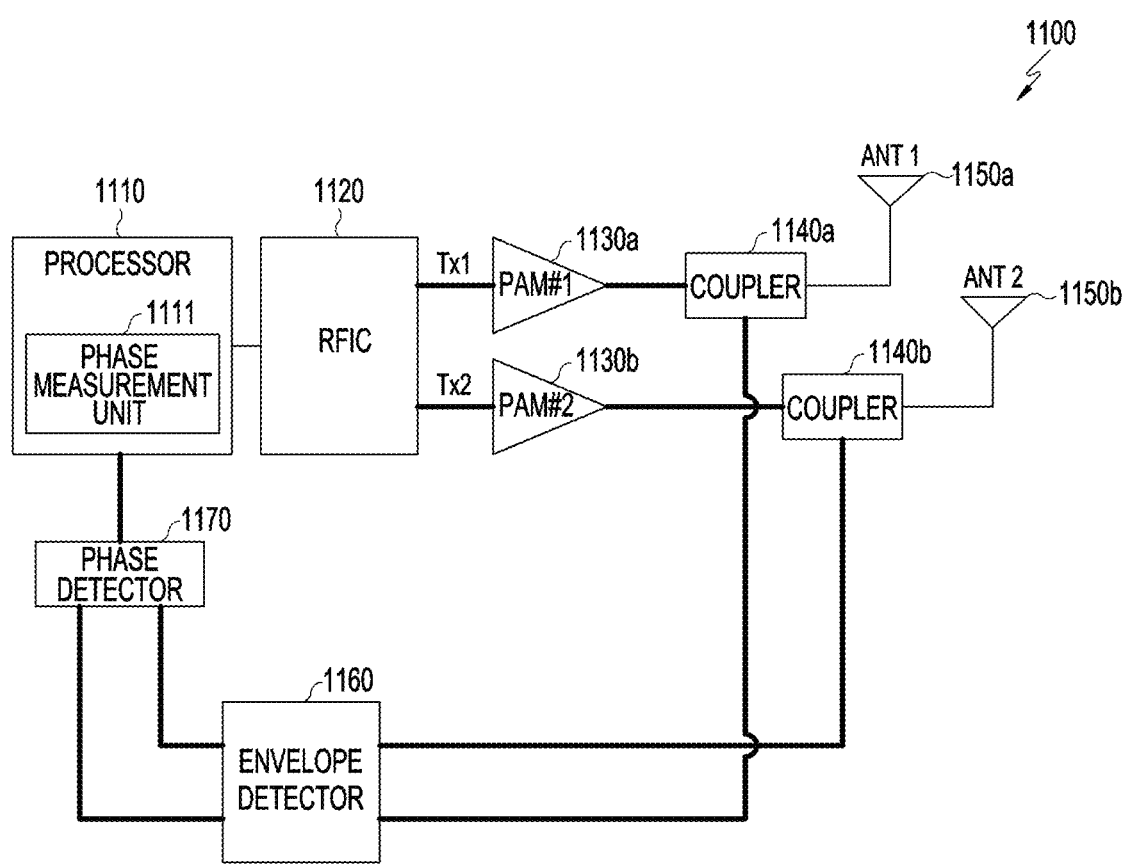
FIG. 11 is an exemplary circuit diagram illustrating a detailed structure of an electronic device according to various embodiments of the present disclosure.

FIG. 11 is a circuit diagram illustrating a detailed structure of an electronic device according to various embodiments. Referring to FIG. 11, an electronic device 1100 (e.g., the electronic device 1000 of FIG. 10) according to various embodiments may include a processor 1110 (e.g., the communication processor 1020 of FIG. 10), a transceiver 1120 (e.g., the transceiver 1030 of FIG. 10), a first power amplifier 1130a (e.g., the first power amplifier 1041a of FIG. 10), a second power amplifier 1130b (e.g., the second power amplifier 1041b of FIG. 10), a first coupler 1140a (e.g., the first coupler 1042a of FIG. 10), a second coupler 1140b (e.g., the second coupler 1042b), a first antenna 1150a (e.g., the first antenna 1050a of FIG. 10), a second antenna 1150b (e.g., the second antenna 1050b of FIG. 10), an envelope detector 1160 (e.g., the envelope detector 1070 of FIG. 10), and a phase detector 1170 (e.g., the phase detector 1080 of FIG. 10). Since each of the above-described components is capable of performing the same or similar function as a component having the same name in FIG. 10, a detailed description will be omitted.

Referring to FIG. 11, the operation of correcting the phases of respective transmission signals using the phase detector 1170 in the electronic device 1100 may be performed in the state in which wireless channels are occupied during the communication mode of a Radio Resource Controller (RRC) protocol. For example, the electronic device 1100 may perform the operation of correcting the phase of each transmission signal whenever the first data is transmitted after entering a CELL_DCH communication mode in which general data transmission is in progress.

The processor 1110 may generate a relative phase difference between the first transmission signal and the second transmission signal using a phase delay so as to transmit the two signals. The relative phase of the first slot of the electronic device 1100 using BFTD algorithm 2 may be set to −24 degrees as described above.

After passing through the couplers 1140a and 1140b, respectively, the first transmission signal and the second transmission signal, transmitted from the first slot, may be input as input signals of the phase detector 1170 through an envelope detector 1160 that serves to detect an envelope of an original transmission signal obtained by removing a carrier frequency component from a modulated signal. The phase detector 1170 may measure a relative phase between the first transmission signal and the second transmission signal using the two signals.

A signal output from the phase detector 1170 may be transmitted to the phase measurement unit 1111 of the processor 1110, and the phase measurement unit 1111 may calculate a phase difference by analyzing the ADC drawn from the phase detector 1170. The processor 1110 may perform a phase correction operation and may correct a random phase error by transmitting each transmission signal after changing the phase thereof using a signal generator based on a corresponding result value.

The random phase error between the two transmission signals may occur for the following reasons.

1. Phase occurring due to a difference in physical length of a Tx signal movement path and environment—(I)
2. Phase occurring due to a difference in timing when ABB signals are mixed in a PLL—(II)
3. Beam-forming phase of two signals set in a processor—(III)

Among the above-mentioned components, the component of Item No. 2 has a form of 90*n (n=1, 2, 3) like 90, 180, and 270 degrees, and the component of Item No. 3 may have a form of −24 degrees in the first slot and may have a form of +24 degrees in the second slot. Through the above-mentioned forms, the components of Items Nos. 2 and 3 may have predetermined forms of values, and the phase calculator may estimate the value of the component of Item No. 1 through the components of Item Nos. 2 and 3.

Figure 12:
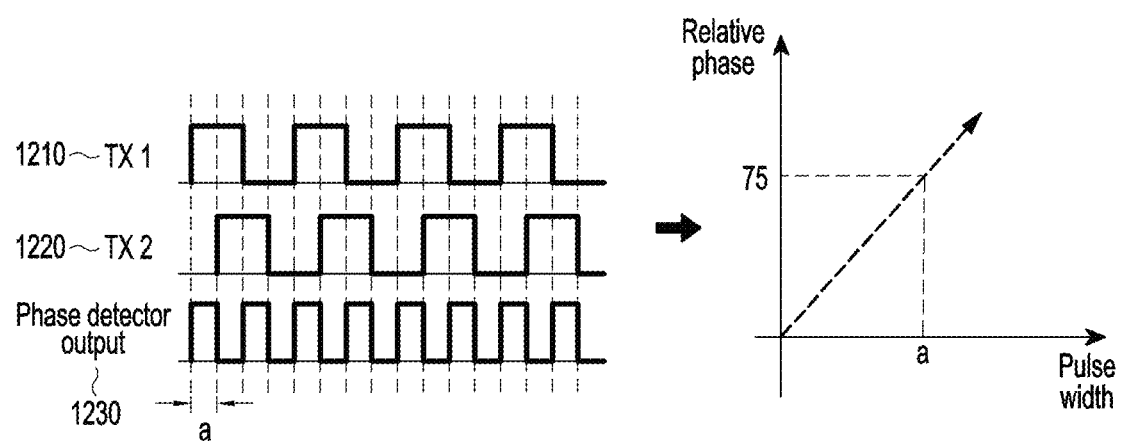
FIG. 12 is an exemplary graph illustrating detection of a phase difference between two signals according to embodiments of the present disclosure.

For example, as illustrated in FIG. 12, the phase detector 1170 has a table (or data) for a pulse width and a relative phase interval, and is capable of determining that the relative phase of the first transmission signal 1210 and the second transmission signal 1220 is 75 degrees by performing conversion into an actual phase value in the phase measurement unit 111 by using the table (or data) and through the ADC values of the output of the phase detector 1170.

As illustrated in FIG. 12, according to various embodiments, since the relative phase (a) of the two transmission signals in the first slot is 75 degrees, it may be expressed by a formula such as "A (75)=I+II(90 or 180 or 270)+(−24)".

For example, the phase occurring due to differences in the physical length of a transmission signal path and environment (Item No. 1) generally causes a small phase error. Thus, for the phase error caused by Item No. 2, a value close to the relative phase (a) may be selected. When the above analysis is combined and substituted into the formula, the following result may be obtained for the phase error component generated in the first slot.

1. Formula: A(75)=I+II(90)+(−24)
2. Result: Relative phase (a)=75 degrees

Phase occurring due to a difference in physical length of a transmission signal movement path and environment (I)=9 degrees Phase occurring due to a difference in timing when ABB signals are mixed in a PLL (II)=90 degrees Beam-forming phase of two signals set in a CP (III)=−24 degrees According to the result, since the actual random phase error is 99 (I+II) degrees, the phase calculator may request the processor 1110 to perform phase compensation by +99 degrees.

The processor 1110, which has completed the phase compensation by +99 degrees, generates a relative phase in the second slot by +24 degrees through a phase delay task, and the phase detector 1170 may examine the relative phase of the second slot in order to determine whether the relative phase is +24 degrees.

When the relative phase of the second slot is checked to be +24 degrees, it can be determined that the phase compensation has been normally performed. When the relative phase is not +24 degrees, the phase calculator may request the processor 1110 to perform phase compensation by 189 degrees assuming that "the phase occurring due to a difference in timing when ABB signals are mixed in the PLL (II)" is 180 degrees.

When the phase compensation is completed through the above process, according to various embodiments, the processor 1110 may store "the phase occurring due to a difference in physical length of the transmission signal movement path and environment (I)" and may use it for phase compensation in the future.

Figure 13:
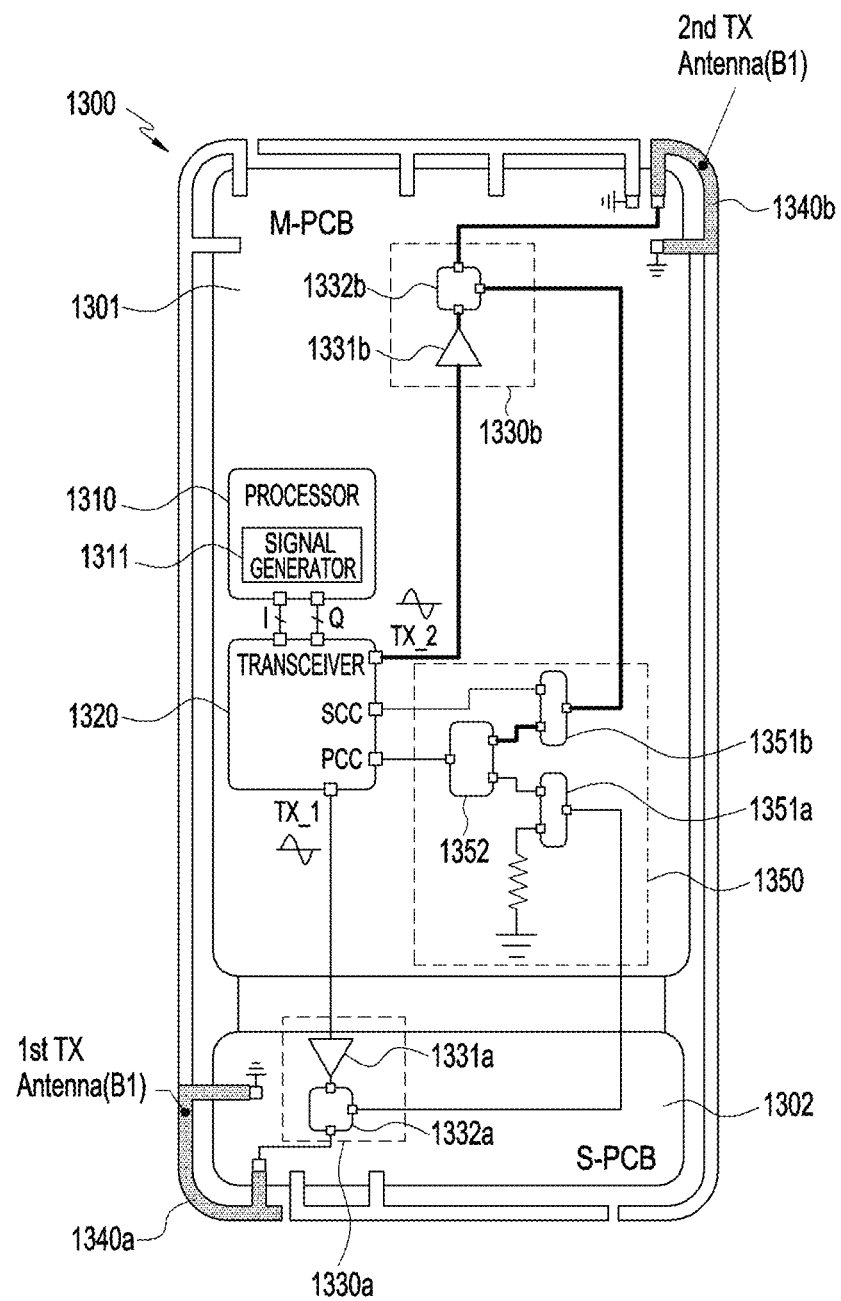
FIG. 13 is an exemplary diagram illustrating an internal configuration of an electronic device according to various embodiments of the present disclosure.

FIG. 13 is a view illustrating an internal configuration of an electronic device according to various embodiments of the present disclosure. Referring to FIG. 13, an electronic device 1300 according to various embodiments may include a main Printed Circuit Board (PCB) 1301 and a sub-PCB 1302. The electronic device 1300 of FIG. 13 may be similar to or the same as the electronic device 100 of FIG. 1 or FIG. 2.

On the main PCB 1301, a processor 1310 (e.g., the processor 260 of FIG. 2), a transceiver 1320 (e.g., the transceiver 250 of FIG. 2), a second transmission/reception circuitry 1330b, dividers 1351a and 1351b, and a combiner 1352 may be disposed, and on the sub-PCB 1302, a first transmission/reception circuitry 1330a may be disposed. The first transmission/reception circuitry 1330a may include a first power amplifier 1331a and a first coupler 1332a and the second transmission/reception circuitry 1330b may include a second power amplifier 1331b and a second coupler 1332b.

The transmission diversity system may include a plurality of transmission antennas 1340a and 1340b. For example, when the LTE system supports 4-RX diversity, 4-TX diversity may be supported. For example, among the antennas included in the housing of FIG. 13, four antennas may be used, and a power detector may be provided in the transceiver 1320 corresponding to the transmission antennas.

Referring to FIG. 13, it can be seen that there is a difference in physical transmission signal movement path from the transceiver 1320 to each antenna, and a phase delay may occur due to the difference in movement path. The phase correction may be performed with respect to the phase delay caused due to the difference in physical length according to the transmission signal movement path. For example, in FIG. 13, dividers 1351a and 1351b and a combiner 1352 may be further disposed in the electronic device 1300 so as to correct a phase difference.

Figure 14:
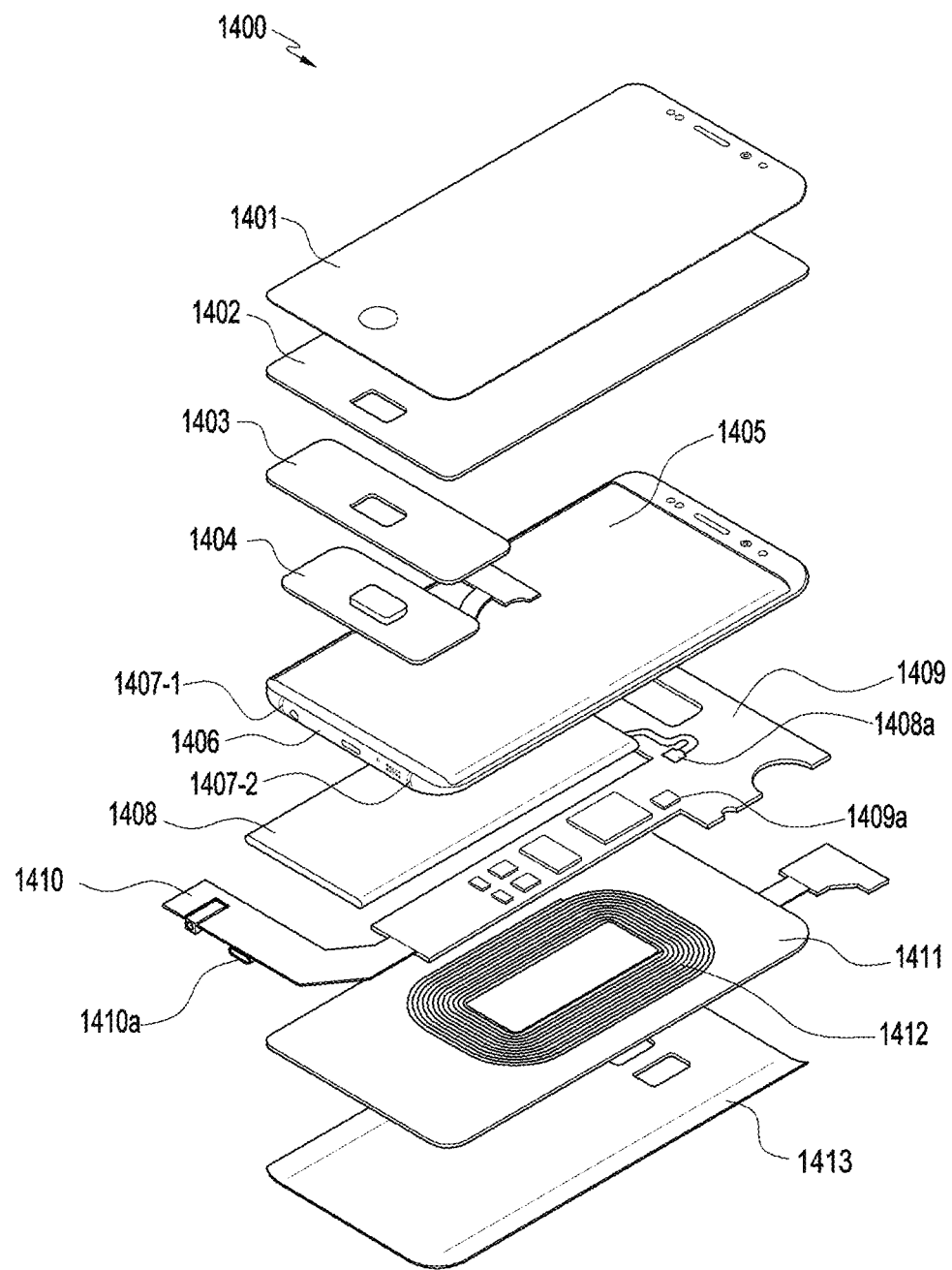
FIG. 14 is an exemplary exploded perspective view illustrating an electronic device according to various embodiments of the present disclosure.

FIG. 14 is an exploded perspective view illustrating an electronic device according to various embodiments of the present disclosure. Referring to FIG. 14, an electronic device 1400 according to various embodiments may include a display panel 1401, a digitizer panel 1402, a pressure touch panel 1403, an optical fingerprint sensor 1404, a metal housing 1405, a battery 1408, a main PCB 1409, a sub-PCB 1410, a wireless coil 1412, an FPCB 1411, and a cover 1413. The electronic device 1400 of FIG. 14 may be similar to or the same as the electronic device 100 of FIG. 1 or FIG. 2.

The display panel 1401 may display a screen according to a screen ratio determined by a display interface unit. For example, the display panel 1401 may display a user interface according to a floating mode or a split mode, and may display an application region or a control region through the interface. Control objects (soft keys) may be displayed in the control region, and the display may provide various screen ratios (e.g., 18.5:9 (basic) and 21:9). The display may be configured to in the form of including a window glass and a TSP panel. The TSP may be attached to the display as an Add On Cell Type as a Y-OCTA structure.

The digitizer panel 1402 may include a touch sensor and may receive a user touch input that is input to the display. The digitizer panel 1402 may have the same size as the display, and is capable of recognizing touch coordinates. For example, the digitizer panel 1402 may constitute RX and TX electrodes and may operate in a capacitive manner. For example, the digitizer panel 1402 may constitute RX and TX electrodes in a single layer, and may combine touch information when a force input is generated so as to utilize coordinate and time information.

The pressure touch panel 1403 may operate in a capacitive manner and may include RX and TX electrode layers (dual layers). In the pressure touch panel 1403, a dielectric may be disposed between the RX and TX electrode layers so as to maintain a gap between the electrodes. The pressure touch panel 1403 may cause a change in the RX and TX electrode intervals by touch pressure, and the capacitive type may include a self-capacitance type and a mutual capacitance type. There may be a difference in electrode configuration depending on whether the capacitive type is the self-capacitance type or the mutual-capacitance type, and the electrodes may be configured on the entire display region or a portion of the display region. A pressure sensor of the pressure touch panel 1403 may be used as a home key.

The optical fingerprint sensor 1404 may be positioned in the lower portion of the display, and is capable of receiving reflected light using a display light source when a fingerprint is touched, and capable of capturing a fingerprint image through a sensor using the reflected light. In addition, the optical fingerprint sensor 1404 is capable of perform personal authentication through analysis of the captured image.

The metal housing 1405 may serve to protect the electronic device and may form a housing top-side face and housing lateral-side face 1406 on the same face. The housing top-side face may include an upper side face and a lower side face, and may be provided with a plurality of slots including a battery swelling slot.

The housing top-side face 1405 and the housing lateral-side face 1406 may be separated or combined with a dielectric, and the housing lateral-side face 1406 may be separated by at least one slit 1407-1 or 1407-2. A display may be mounted on the metal housing 1405 in the first direction (upper side), and a conductive film and a dielectric may be disposed between the metal housing 1405 and the display.

PCBs 1409 and 1410, a battery 1408, and a cover 1413 may be mounted on the metal housing 1405 in a second direction (lower side). The metal housing 1405 may form the housing lateral-side face 1406 exposed to the outside. The surface of the metal housing 1405 may be used as an antenna and may be connected to the RF circuitries of the PCBs 1409 and 1410. The surface of the metal housing 1405 may be separated into a plurality of structures by housing slits 1407. The housing slits 1407 are made of a dielectric, and may separate the structures of the metal housing 1405.

The PCBs may be divided into a main PCB 1409 and a sub-PCB 1410, and may be electrically connected to each other by a connector. The PCBs 1409 and 1410 may include connection circuitries between RF circuit components, and the RF circuit components may include a communication processor, a transceiver, a power amplifier, a bandpass filter, a duplexer, a diplexer, and so on. The PCBs 1409 and 1410 and the housing antenna may be electrically connected to each other through connection members. The connection members between the PCBs and the housing may include a screw and a C-clip. The screw is capable of strongly bringing the PCBs and the housing into close contact with each other, thereby enhancing electrical connection property. For example, the screw may enhance a ground or a feeding portion. The battery 1408 may be connected to the main PCB 1409 by a battery connector 1408a.

RF circuit connection between the sub-PCB 1410 and the main PCB 1409 may be implemented through a coaxial cable and the circuit connection, except for an RF signal between the PCBs, may be implemented through a B-to-B connector. The sub-PCB may include connection portions for an ear-jack, a USB 1410a, a speaker, and an antenna.

According to various embodiments, the antenna may utilize the housing surface exposed to the outside as an antenna structure. One housing structure may constitute an inverted F-antenna, and the inverted F-antenna may be connected to one feeding portion and one ground. The one housing structure may be electrically connected to the PCBs through connection members, and one end of the one structure may be connected to the feeding portion or ground. For example, when one end is a feeding portion, the ground may be connected to the middle of the structure, and when one end is a ground, the feeding portion may be connected to the middle of the structure.

Figure 15:
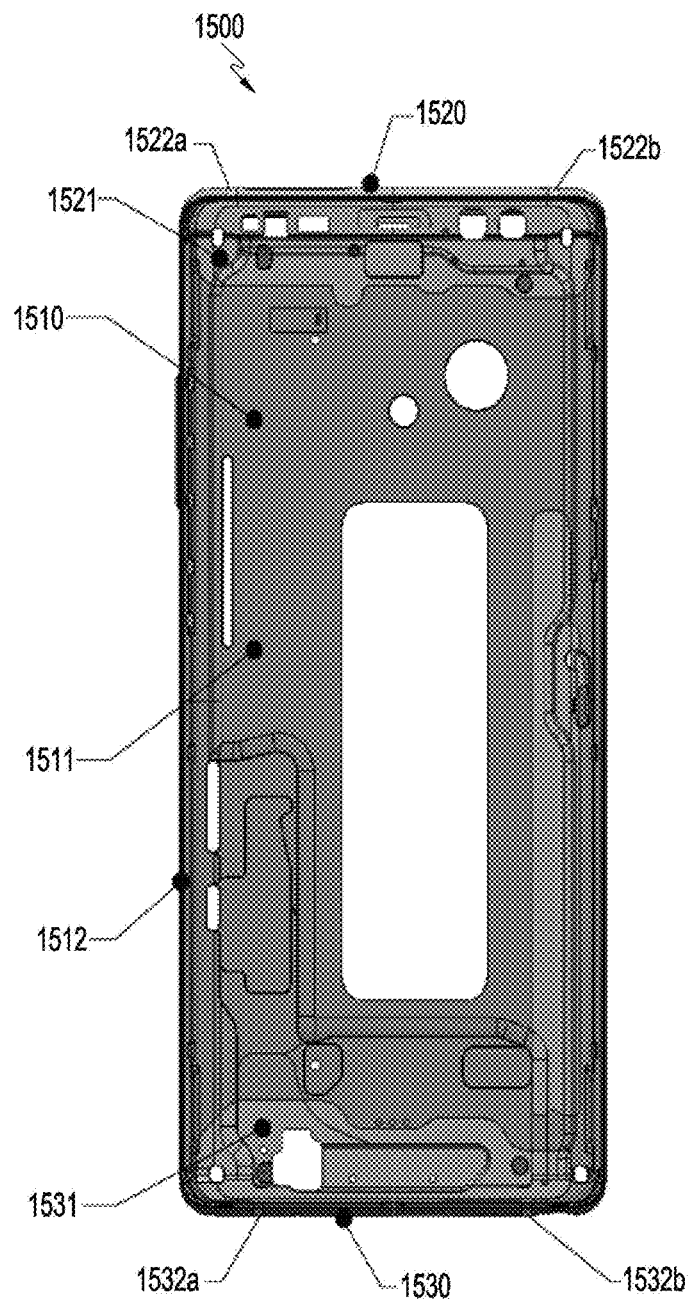
FIG. 15 is an exemplary view illustrating the inside of a housing of an electronic device according to various embodiments of the present disclosure.
Figure 16:
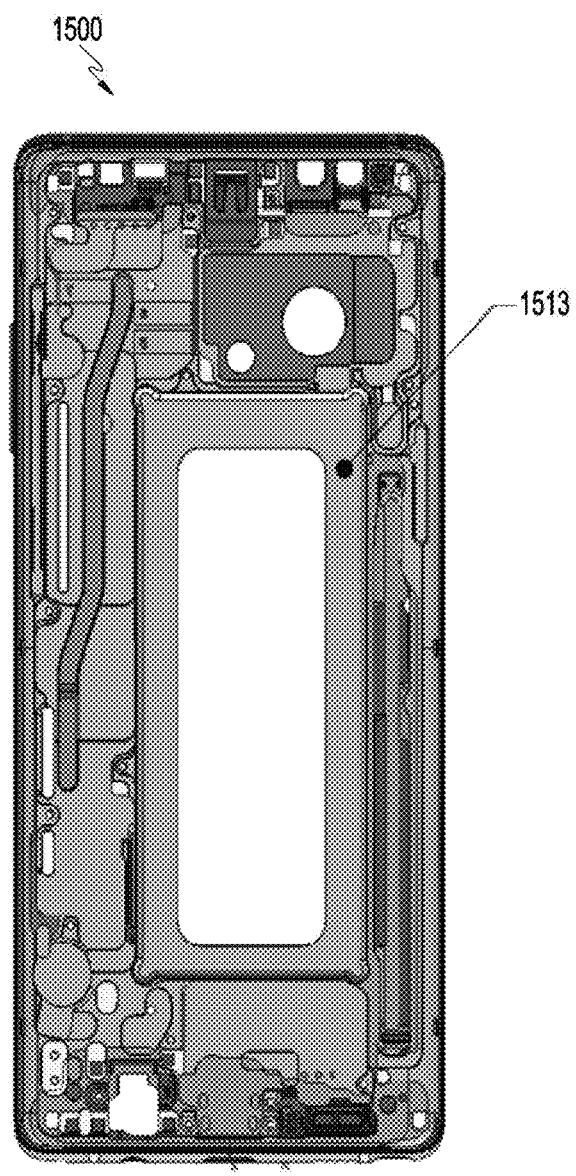
FIG. 16 is an exemplary view illustrating the inside of a housing of an electronic device according to various embodiments of the present disclosure.

FIGS. 15 and 16 are views each illustrating the inside of a housing of an electronic device according to various embodiments.

Referring to FIG. 15, the housing may be physically divided into three structures. The three structures may include an upper end structure 1520, a lower end structure 1530, and a central structure 1510, and may be assembled into an integral structure by adding dielectric materials 1521 and 1531 between the structures. The electronic device 1500 of FIG. 15 may be similar to or the same as the electronic device 100 of FIG. 1 or FIG. 2.

Slits 1522a, 1522b, 1532a, and 1532b filled with a dielectric between the structures may be referred to as "segments" or "insulation bands". The housing may be divided into a first face (front) 1511 for supporting a display, a second face (rear) 1513 for supporting a PCBs and a battery, a rear glass window, a third face (side) 1512. The third face 1512 of the housing structure is a housing surface exposed to the outside and may be utilized as an antenna structure.

In one embodiment, the housing structure may be divided into three structures, and the third face 1512, which is a side face of the housing, may be divided into a plurality of antenna structures by slit structures. For example, the side face of the housing may be divided into four antenna structures by housing slits.

Figure 17:
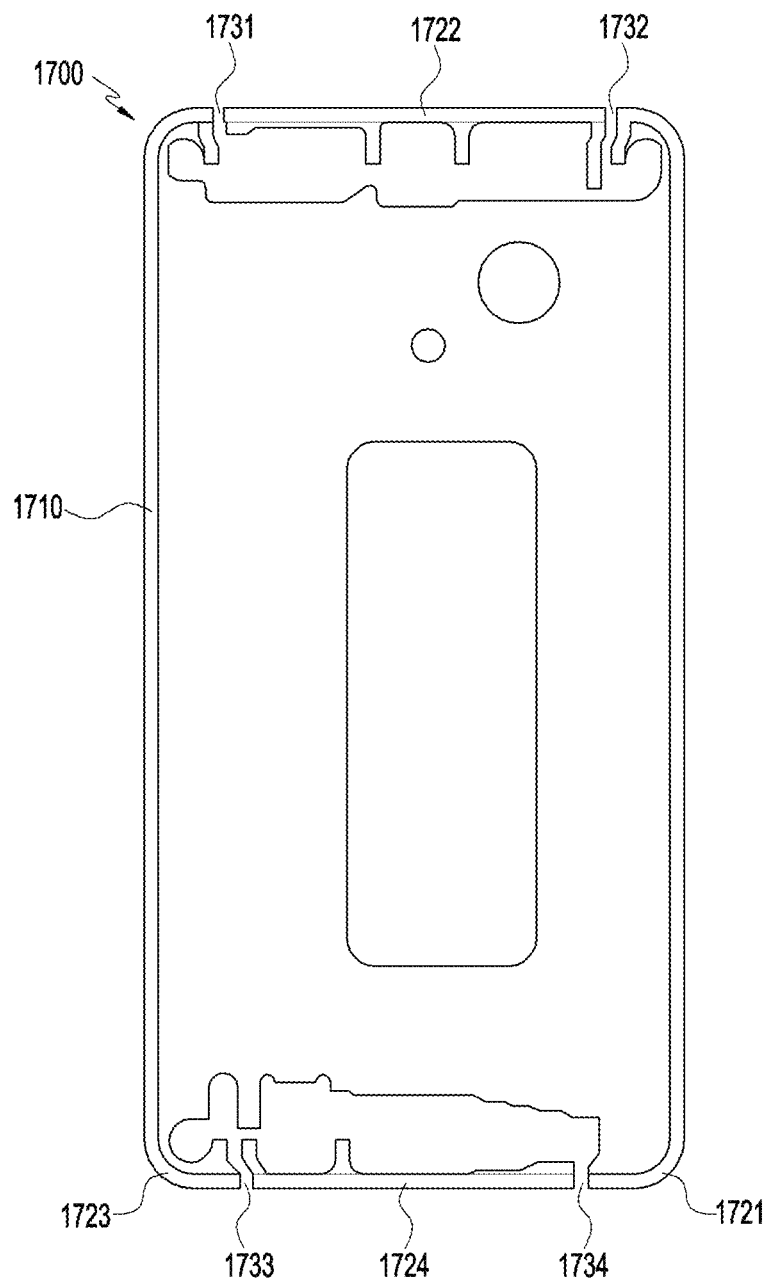
FIG. 17 is an exemplary view illustrating a housing antenna structure of an electronic device according to various embodiments of the present disclosure.
Figure 18:
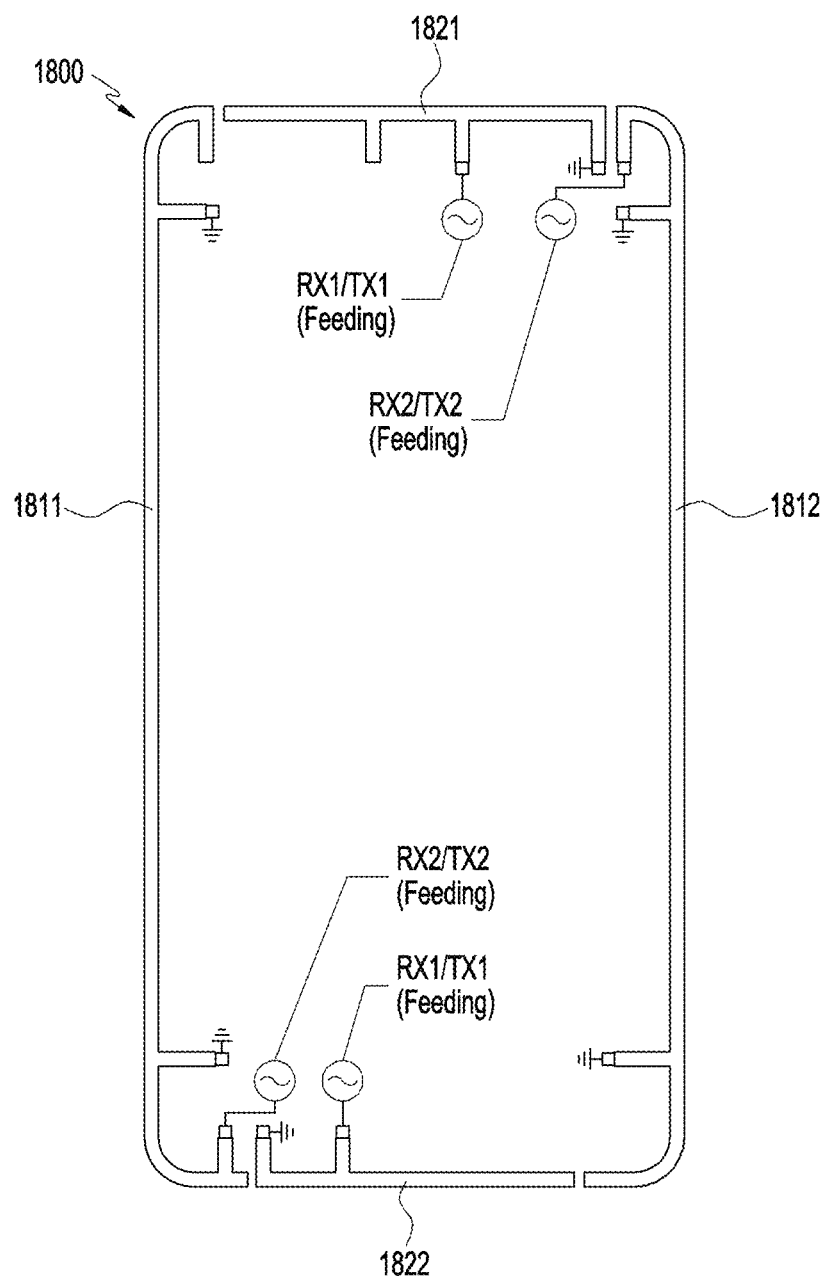
FIG. 18 is an exemplary view illustrating a housing antenna structure of an electronic device according to various embodiments of the present disclosure.

FIGS. 17 and 18 are views each illustrating a housing antenna structure of an electronic device according to various embodiments. Referring to FIGS. 17 and 18, an antenna structure 1700 may have a frequency characteristic determined by a physical antenna length. The physical length of the antenna may be determined by the lengths of a feeding portion and one end of the structure or the lengths of a feeding portion and a ground. For example, two types of antenna structures may be used by using the antenna length and frequency characteristics. The electronic device 1700 of FIG. 17 and the electronic device 1800 of FIG. 18 may be similar to or the same as the electronic device 100 of FIG. 1 or FIG. 2.

In the side face 1710 of the housing, a plurality of antennas 1721, 1722, 1723, 1724, 1811, 1812, 1821, and 1822 may be distinguished by slits 1731, 1732, 1733, and 1734.

A first type structure illustrated in FIG. 17 is a structure in which a feeding portion is disposed in the middle thereof and a portion up to one end, to which the feeding portion and the ground are not connected, is used as an antenna length. For example, a second structure 1722 and a fourth structure 1724 may be exemplified, which are suitable for a low frequency band (700 MHZ to 1 GHz) because the antenna length is relatively long. A second type structure illustrated in FIG. 18 is a structure which has a short antenna length since a feeding portion is disposed at one end thereof and aground is connected to the middle thereof. For example, a first structure 1721 and a third structure 1723 may be exemplified, which are suitable for a high frequency band (1.5 GHz to 2.7 GHz) because the antenna length is relatively short. The same type of antenna structure may be configured to transmit and receive frequency signals (e.g., RX1 and TX1) of the same band. For example, structures facing each other are capable of inputting the frequency transmission/reception signals of the same band.

Figure 19:
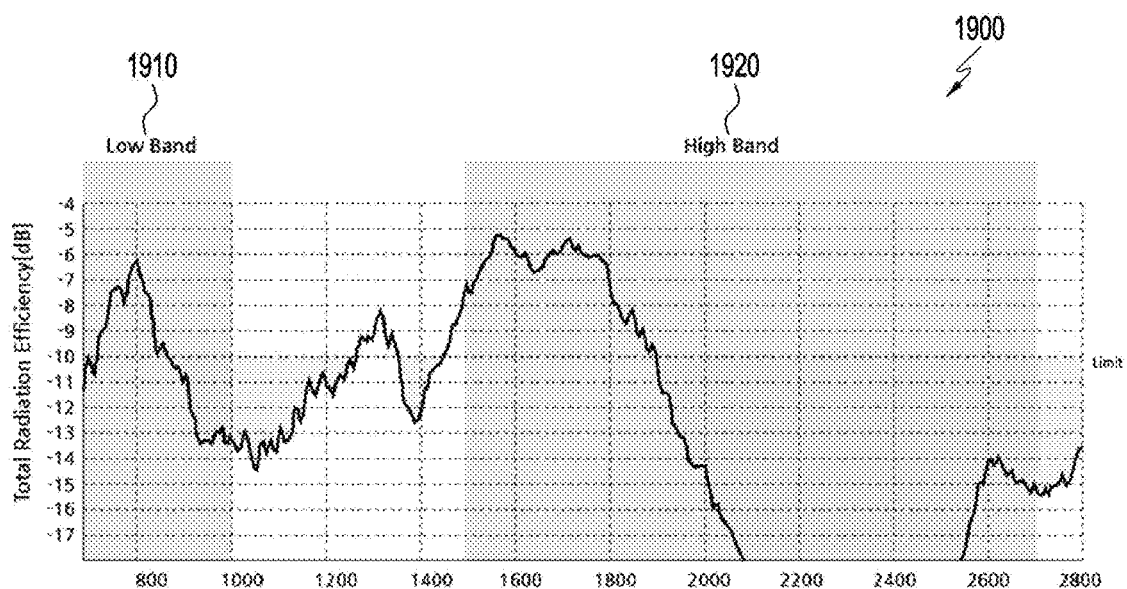
FIG. 19 is an exemplary graph illustrating a low-frequency band frequency characteristic of an antenna structure according to various embodiments of the present disclosure.
Figure 20:
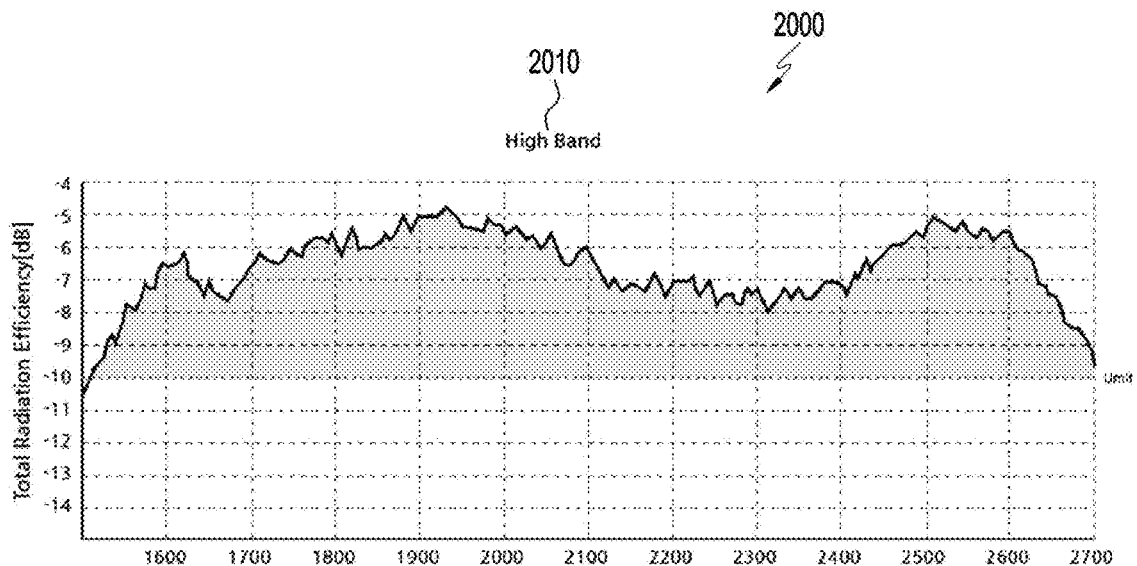
FIG. 20 is an exemplary graph illustrating a high-frequency band frequency characteristic of an antenna structure according to various embodiments of the present disclosure.

FIG. 19 is a graph illustrating a low-frequency band frequency characteristic of an antenna structure according to various embodiments of the present disclosure, and FIG. 20 is a graph illustrating a high-frequency band frequency characteristic of an antenna structure according to various embodiments of the present disclosure. For example, graph 1900 in FIG. 19 represents the low frequency 1910 characteristics of the first type structure, but may meet the limiting criteria of antenna characteristics for a portion of a high frequency band 1920. Since graph 1900 of FIG. 19 cannot cover the overall high frequency band, the first type structure can be utilized as a low frequency band antenna structure. Graph 2000 of FIG. 20 represents the high frequency 2010 characteristics of the second type structure.

Figure 21:
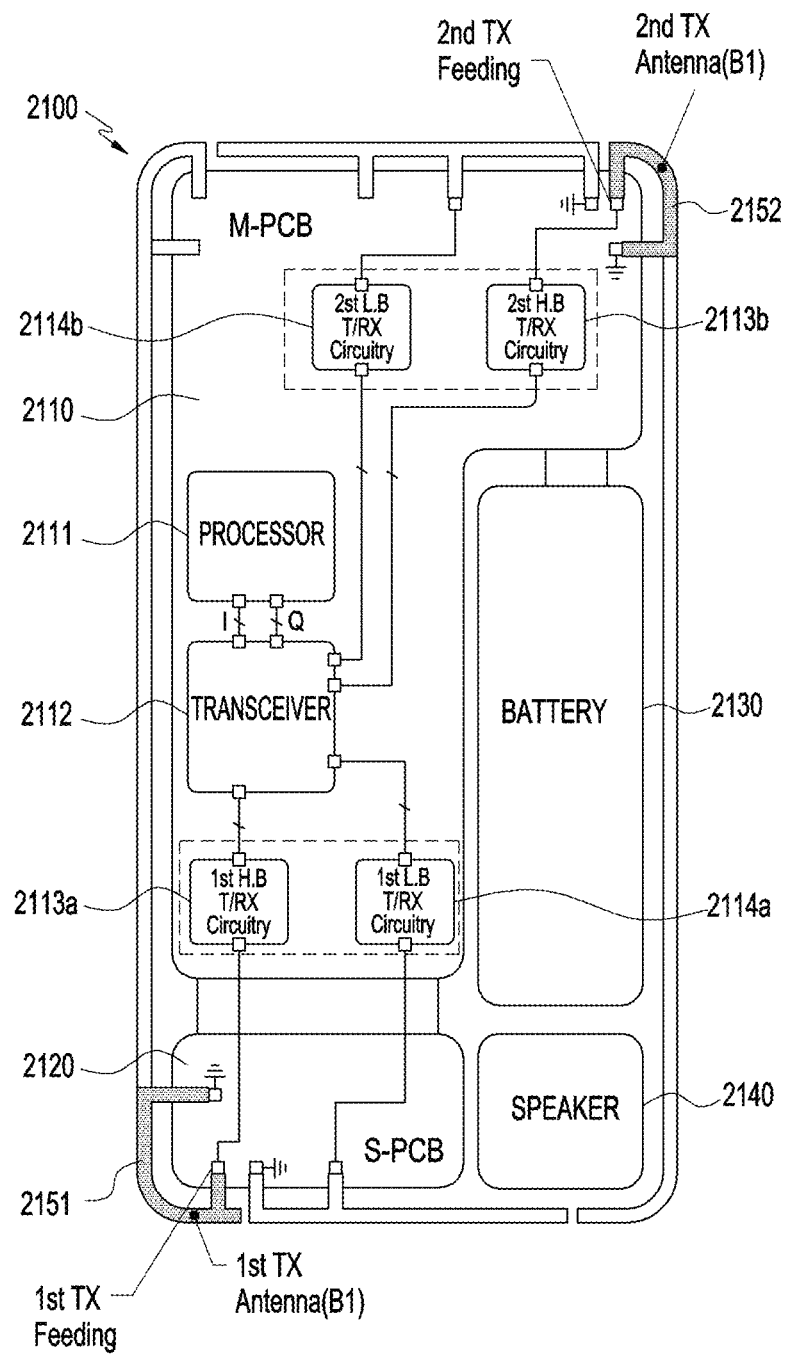
FIG. 21 is an exemplary view illustrating an internal configuration of an electronic device according to various embodiments of the present disclosure.
Figure 22:
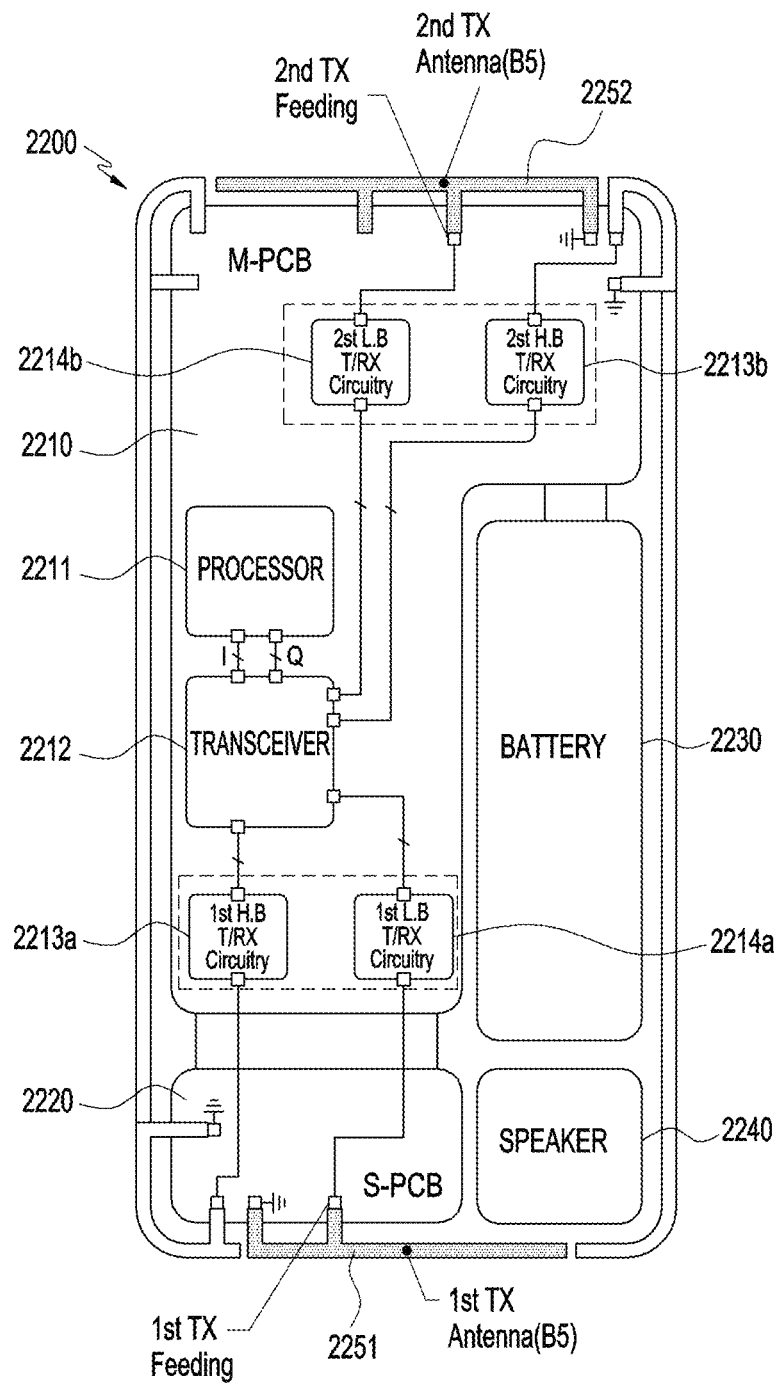
FIG. 22 is an exemplary view illustrating an internal configuration of an electronic device according to various embodiments of the present disclosure.

FIGS. 21 and 22 are views each illustrating an internal configuration of an electronic device according to various embodiments of the present disclosure. Referring to FIGS. 21 and 22, an electronic device 2100 or 2200 according to various embodiments may include a main PCB 2110 or 2210, a sub-PCB 2120 or 2220, a battery 2130 or 2230, and a speaker 2140 or 2240. The electronic device 2100 of FIG. 21 and the electronic device 2200 of FIG. 22 may be similar to or the same as the electronic device 100 of FIG. 1 or FIG. 2.

On the main PCB 2110 or 2210, a processor 2111 or 2211 (e.g., the processor 260 of FIG. 2), a transceiver 2112 or 2212 (e.g., the transceiver 250 of FIG. 2), a first high-band transmission/reception circuitry 2113*a* or 2213*a*, second high-band transmission/reception circuitry 2113*b* or 2213*b*, a first low-band transmission/reception circuitry 2114*a* or 2214*a*, and a second low-band transmission/reception circuitry 2114*b* or 2214*b*.

A transmission diversity system may include a plurality of transmission antennas 2151 and 2152 or 2251 and 2252. For example, when the LTE system supports 4-RX diversity, 4-TX diversity may be supported. For example, four antennas among the antennas provided in the housing of FIG. 21 or FIG. 22 may be used.

The transceiver 2112 of FIG. 21 is capable of receiving a signal reflected through a feedback line connected to the first high-band transmission/reception circuitry 2113*a* and capable of receiving a signal reflected through a feedback line connected to the second high-band transmission/reception circuitry 2113*b*. The transceiver 2212 of FIG. 22 is capable of receiving a signal reflected through a feedback line connected to the first low-band transmission/reception circuitry 2214*a* and capable of receiving a signal reflected through a feedback line connected to the second low-band transmission/reception circuitry 2214*b*.

The antennas provided in the housing may be arranged vertically according to the frequency characteristics, and the housing antennas having frequency characteristics of similar bands may be arranged to be vertically symmetrical to each other in consideration of isolation performance between diversity signals. FIG. 21 illustrates an example of a transmission diversity system that includes a plurality of transmission antennas having a high-frequency band (e.g., LTE B1 band), and FIG. 22 illustrates an example of a transmission diversity system that includes a plurality of transmission antennas having a low-frequency band (e.g., LTE B5 band).

The electronic device 2100 or 2200 according to various embodiments may a control beam-forming angle (e.g., α or β) of an antenna through phase control for a first signal (e.g., a primary transmission signal) and a second signal (e.g., a diversity transmission signal) for transmission diversity.

Figure 23:
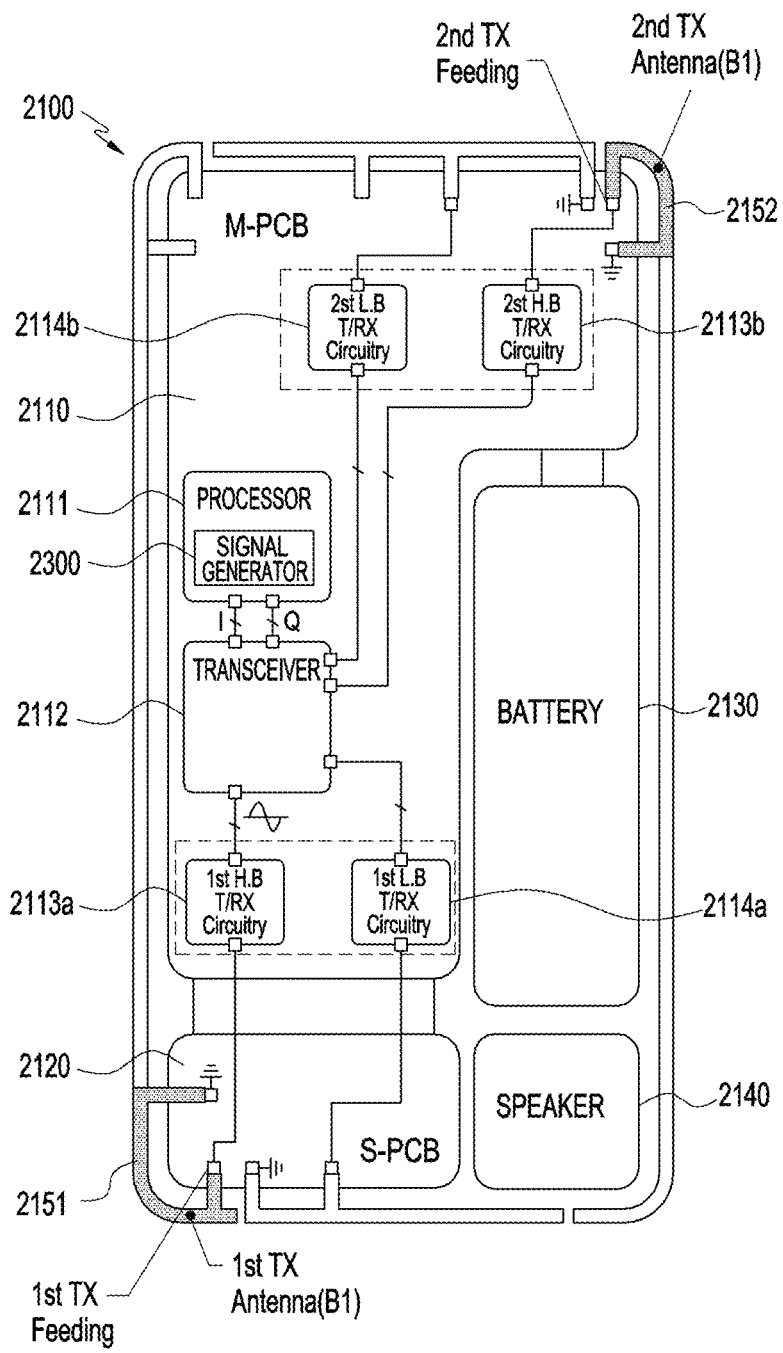
FIG. 23 is an exemplary view illustrating an internal configuration of an electronic device according to various embodiments of the present disclosure.

The phase control for the first signal and/or the second signal may be performed in a digital or analog manner. The digital manner may control the phase of the first signal and/or the second signal output through the transceiver 2112 by adding a delay time when generating an I/Q signal through a signal generator 2300 included in a processor 2111 (e.g., a communication processor), as illustrated in FIG. 23.

Figure 24:
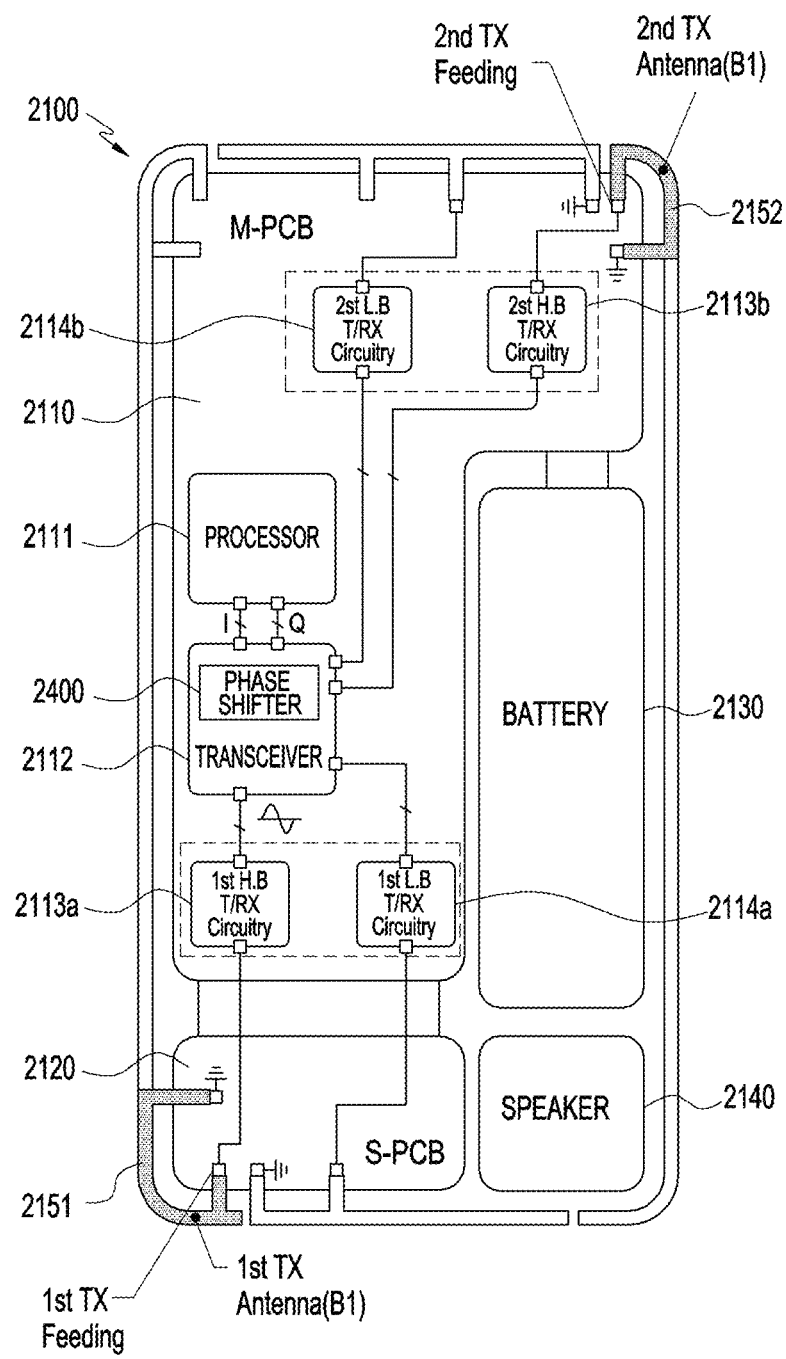
FIG. 24 is an exemplary view illustrating an internal configuration of an electronic device according to various embodiments of the present disclosure.

The analog manner may control the phase by adding a buffered phase shifter circuitry (or a phase shifter 2400) on the path of the first signal and/or the second signal, as illustrated in FIG. 24.

Figure 25:
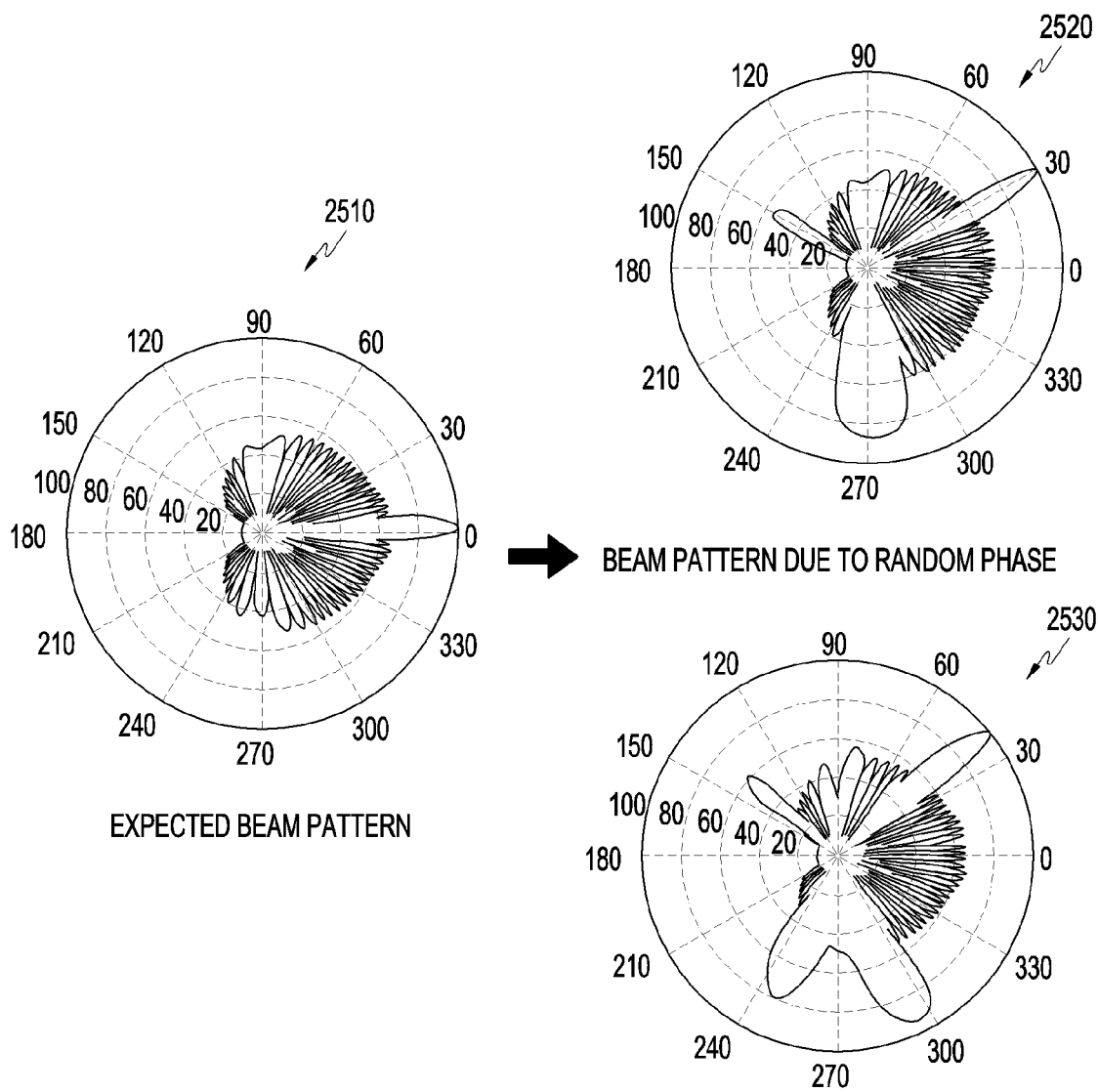
FIG. 25 is an exemplary graph illustrating beam-forming by transmission diversity according to various embodiments of the present disclosure.

FIG. 25 is a graph illustrating beam-forming by transmission diversity according to various embodiments of the present disclosure. Referring to FIG. 25, an example in which an actual random phase occurs as illustrated in the case where a phase difference caused due to a phase shift between two transmission signals occurs. For example, an electronic device expects a specific antenna beam pattern 2510 and generates and transmits transmission signals.

However, due to physical limitations of the RF system of the electronic device, the antenna beam pattern may be generated in an unexpected direction as indicated by 2520 or 2530. This may cause problems such as call drop and transmission mute (a phenomenon in which voice data cannot be transmitted to the opposite party) during a call, leading to a decrease in call reliability and call quality. The above-problems can be solved by correcting a phase difference between the transmission signals.

Figure 26:
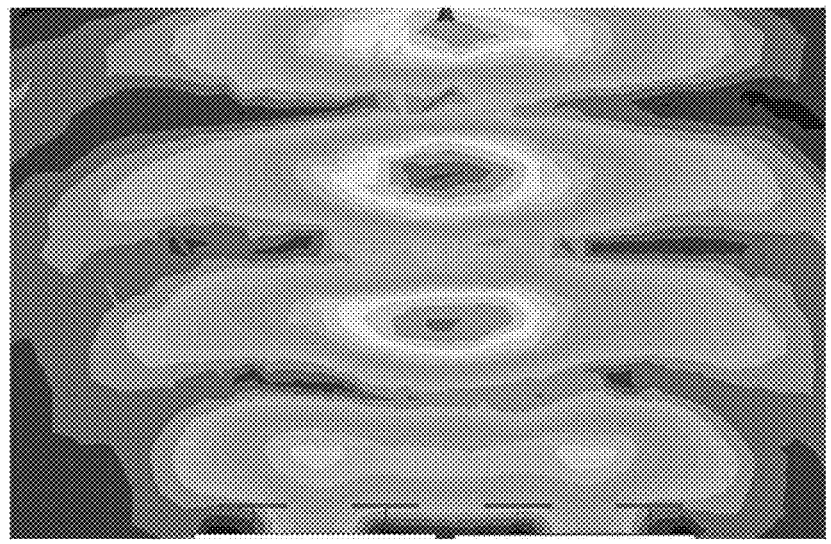
FIG. 26 is an exemplary graph illustrating beam-forming of transmission signals according to various embodiments of the present disclosure.
Figure 27:
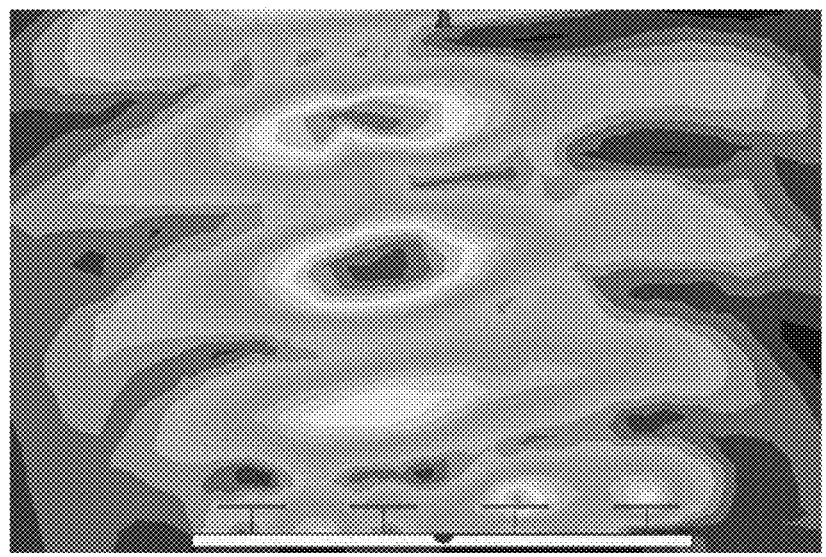
FIG. 27 is an exemplary graph illustrating beam-forming of transmission signals according to various embodiments of the present disclosure.

FIGS. 26 and 27 are graphs 2600 and 2700 each illustrating beam-forming of transmission signals according to various embodiments of the present disclosure. The Digital Beam-Forming (DBF) technique refers to a technique of forming a beam pattern in a desired direction using an array antenna. For example, the maximum power is supplied in a desired direction by controlling the power and phase to be supplied to the array antenna. By using the above-described technique, it is possible not only to improve reception sensitivity, but also to increase a data transmission speed and to minimize call collision. The corresponding technique is currently employed in Wibro, WLAN, or the like.

FIG. 26 is a diagram 2600 illustrating the shape of a beam formed when four antennas transmit transmission signals in the same phase, and FIG. 27 is a diagram 2700 illustrating the shape of a beam formed when four antennas transmit transmission signals in different phases. Upon comparing FIG. 26 and FIG. 27, it can be seen that the angle of the beam in FIG. 27 is distorted compared with that in FIG. 26. The desired shape of a beam can be formed in a desired direction by correcting the phase difference between the transmission signals.

Figure 28:
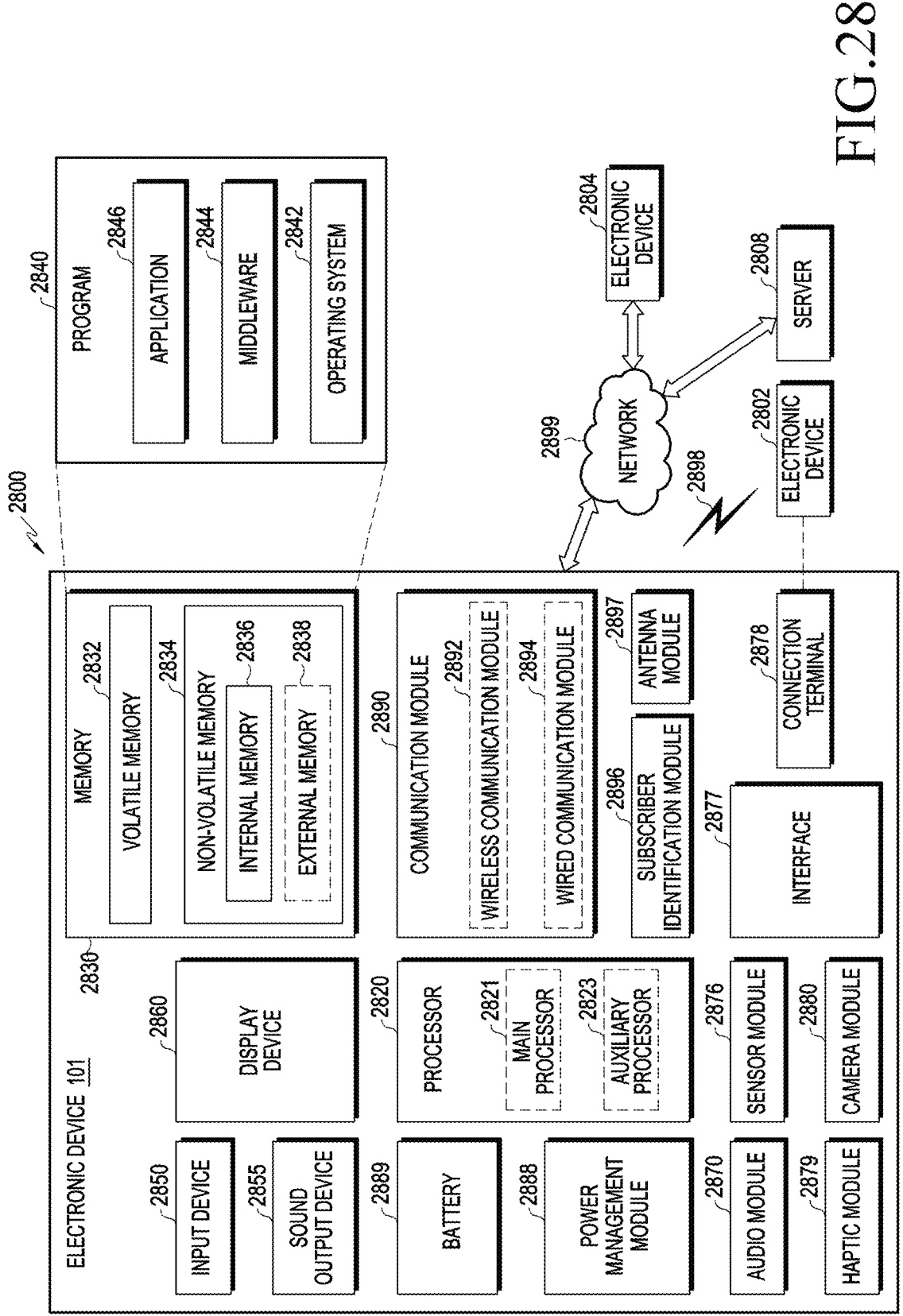
FIG. 28 is an exemplary diagram illustrating an electronic device in a network environment according to various embodiments of the present disclosure.

FIG. 28 is a block diagram illustrating an electronic device 2801 (e.g., the electronic device 100) in a network environment 2800, according to various embodiments of the present disclosure. Referring to FIG. 28, the electronic device 2801 in the network environment 2800 may communicate with an electronic device 2802 via a first network 2898 (e.g., short-range wireless communication), or may communicate with an electronic device 2804 or a server 2808 via a second network 2899 (e.g., long-range wireless communication). The electronic device 2801 may communicate with the electronic device 2804 via the connector 2808. The electronic device 2801 may include a processor 2820 (e.g., the processor 260 of FIG. 2), a memory 2830, an input device 2850, a sound output device 2855, a display device 2860, an audio module 2870, a sensor module 2876, an interface 2877, a haptic module 2879, a camera module 2880, a power management module 2888, a battery 2889, a communication module 2890 (e.g., the processor 260 of FIG. 2), a subscriber identification module 2896, and an antenna module 2897. In some embodiments, at least one (e.g., the display device 2860 or the camera module 2880) of these components may be eliminated from the electronic device 2801 or other components may be added to the electronic device 101. Some components may be implemented in an integrated form like, for example, the sensor module 2876 (e.g., a fingerprint sensor, an iris sensor, or an illuminance sensor), which is embedded in, for example, the display device 2860.

The processor 2820 may control one or more other components (e.g., a hardware or software component) of the electronic device 2801, which are connected to the processor 2820, and may perform various data processing and arithmetic operations by driving, for example, software (e.g., a program 2840). The processor 2820 may load commands or data, which are received from other components (e.g., the sensor module 2876 or the communication module 2890), into a volatile memory 2832 so as to process the commands or data, and may store resulting data into a non-volatile memory 2834. The processor 2820 may include a main processor 2821 (e.g., a central processing unit or an application processor), and an auxiliary processor 2823, which operates independently from the main processor 2821, additionally or alternatively uses a lower power than the main processor 121, or includes an auxiliary processor 123 specialized for a predetermined function (e.g., a graphic processor device, an image signal processor, a sensor hub processor, or a communication processor). Here, the auxiliary processor 2823 may be operated separately from the main processor 2821 or in the manner of being embedded with the main processor 121.

In this case, the auxiliary processor 2823 may control at least some functions or states associated with at least one of the components of the electronic device 2801 (e.g., the display device 2860, the sensor module 2876, or the communication module 2890), on behalf of the main processor 2821, for example, while the main processor 2821 is in an inactive (e.g., sleep) state, or together with the main processor 2821 while the main processor 2821 is in an active (e.g., application execution) state. According to one embodiment, the auxiliary processor 2823 (e.g., an image signal processor or a communication processor) may be implemented as some of other functionally related components (e.g., camera module 2880 or communication module 2890). The memory 2830 may store various data used by at least one component (e.g., the processor 2820 or the sensor module 2876) of electronic device 2801, for example, software (e.g., the program 2840) and input or output data for commands which are associated with the software. The memory 2830 may include, for example, a volatile memory 2832 or a non-volatile memory 2834.

The program 2840 may be software stored in the memory 2830 and may include, for example, an operating system 2842, middleware 2844, or application 2846.

The input device 2850 is a device for receiving, from the outside (e.g., the user), commands or data to be used in a component (e.g., the processor 2820) of the electronic device 2801, and may include, for example, a microphone, a mouse, or a keyboard.

The sound output device 2855 is a device for outputting a sound signal to the outside of the electronic device 2801. The output device 155 may include, for example, a speaker for general use such as multimedia reproduction or sound reproduction and a receiver used only for telephone reception. According to one embodiment, the receiver may be formed integrally with or separately from the speaker.

The display device 2860 is a device for visually providing information to a user of the electronic device 2801 and may include, for example, a display, a hologram device, or a projector and a control circuitry for controlling the corresponding device. In one embodiment, the display device 2860 may include a touch circuitry or a pressure sensor capable of measuring the intensity of the pressure on the touch.

The audio module 2870 may bidirectionally convert sound and electrical signals. The audio module 2870 may acquire sound through the input device 2850 or may output sound through the sound output device 2855 or an external electronic device (e.g., the electronic device 2802 (e.g., a speaker or headphone)) connected with the electronic device 2801 in a wireless or wired manner.

The sensor module 2876 may generate an electrical signal or a data value corresponding to an internal operating state (e.g., power or temperature) of the electronic device 2801 or an external environmental condition. The sensor module 2876 may include, for example, a gesture sensor, a gyro sensor, an atmospheric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2877 may support a predetermined protocol that may be connected to an external electronic device (e.g., the electronic device 2802) in a wired or wireless manner. According to one embodiment, the interface 2877 may include a High Definition Multimedia Interface (HDMI), a Universal Serial Bus (USB) interface, an SD card interface, or an audio interface.

The connection terminal 2878 may be a connector capable of physically interconnecting the electronic device 2801 and an external electronic device (e.g., the electronic device 2802), such as an HDMI connector, a USB connector, an SD card connector, or an audio connector (e.g., a headphone connector).

The haptic module 2879 may convert an electrical signal into a mechanical stimulus (e.g., vibration or motion) or an electrical stimulus that the user can perceive through a tactile or kinesthetic sense. The haptic module 2879 may include, for example, a motor, a piezoelectric element, or an electrical stimulation device.

The camera module 2880 is a device that is capable of capturing, for example, a still image and a video image. The camera module 2880 may include one or more lenses, an image sensor, an image signal processor, or a flash.

The power management module 2888 is a module for managing power supplied to the electronic device 2801, and may be configured as at least a part of, for example, a Power Management Integrated Circuit (PMIC).

The battery 2889 is a device for supplying power to at least one component of the electronic device 2801 and may include, for example, a non-rechargeable primary battery, a rechargeable secondary battery, or a fuel cell.

The communication module 2890 may establish a wired or wireless communication channel between the electronic device 2801 and an external electronic device (e.g., the electronic device 2802, the electronic device 2804, or the server 2808) and may support communication via the established communication channel. The communication module 2890 may include a processor 2820 (e.g., an application processor) and one or more communication processors, which are independently operated and support wired communication or wireless communication. The communication module 2890 may include a wireless communication module 2892 (e.g., a cellular communication module, a short range wireless communication module, or a Global Navigation Satellite System (GNSS) communication module) or a wired communication module 2894 (e.g., a Local Area Network (LAN) communication module or a power line communication module), and may communicate with an external electronic device via a first network 2898 (e.g., a short-range communication network, such as Bluetooth, WiFi direct, or Infrared Data Association (IrDA)) or a second network 2899 (e.g., a long-range communication network, such as a cellular network, the Internet, or a computer network (e.g., a LAN or a WAN)), using a corresponding communication module among the above-mentioned communication modules. Various types of communication modules 2890 described above may be implemented as a single chip or may be implemented as separate chips, respectively.

In one embodiment, the wireless communication module 2892 may identify and authenticate the electronic device 2801 within the communication network using the user information stored in the subscriber identification module 2896.

The antenna module 2897 may include one or more antennas configured to transmit/receive signals or power to/from the outside. The communication module 2890 (e.g., the wireless communication module 2892) may transmit/receive signals to/from an external electronic device via an antenna suitable for the communication scheme thereof.

Among the components described above, some components may be connected to each other via a communication scheme (e.g., a bus, a General-Purpose Input/Output (GPIO), a Serial Peripheral Interface (SPI), or a Mobile Industry Processor Interface (MIPI)) and may exchange signals (e.g., commands or data) therebetween.

The commands or data may be transmitted or received between the electronic device 2801 and the external electronic device 2804 via the server 2808 connected to the second network 2899. Each of the electronic devices 2802 and 2804 may be of a type, which is the same as or different from the electronic device 2801. All or some of the operations executed in the electronic device 2801 may be executed in another external electronic device or a plurality of external electronic devices. In the case where the electronic device 2801 should perform a certain function or service automatically or by a request, the electronic device 2801 may request some functions, which are associated with the function or service, from an external electronic device, instead of, or in addition to, executing the functions or the service by itself. The external electronic device, which receives the request, may execute the requested functions or additional functions, and may transmit the results to the electronic device 2801. The electronic device 2801 may provide the requested functions or services by processing the received results as they are or additionally. For this purpose, for example, a cloud computing technique, a distributed computing technique, or a client-server computing technique may be used.

Each of the components described in various embodiments may be constituted with one or more components, and the names of the corresponding components may vary depending on a type of an electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

At least some of the devices (for example, modules or functions thereof) or the method (for example, operations) according to the present disclosure may be implemented by a command stored in a computer-readable storage medium in a programming module form. The instruction, when executed by a processor (e.g., the processor 2820), may cause the one or more processors to execute the function corresponding to the instruction. The computer-readable storage medium may be, for example, the memory 2830.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing;
a first antenna located inside the housing or in a first portion on the housing;
a second antenna located inside the housing or in a second portion on the housing to be spaced apart from the first portion of the housing;
a transceiver configured to generate a first signal and a second signal;
a first coupler electrically connected between the first antenna and the transceiver, and configured to receive the first signal from the transceiver, and forward the first signal to the first antenna and a first feedback signal of the first signal to a control circuitry;
a second coupler electrically connected between the second antenna and the transceiver, and configured to receive the second signal from the transceiver, and forward the second signal to the second antenna, and a second feedback signal of the second signal to the control circuitry; and
the control circuitry operatively connected to the transceiver, wherein the transceiver, the first coupler, the second coupler, and the control circuitry are located inside the housing, and wherein the control circuitry is configured to:
determine a maximum amplitude of a combined signal, which is a combination of the first feedback signal and the second feedback signal; and cause the transceiver to adjust a phase of at least one of the first signal and a phase of the second signal such that the maximum amplitude of the combined signal corresponds to a predetermined value.

2. The electronic device of claim 1, further comprising:
a communication processor including the control circuitry.

3. The electronic device of claim 1, further comprising:
a combiner electrically connected to the first coupler, the second coupler, and the control circuitry.

4. The electronic device of claim 3, wherein the combiner is configured to combine the first feedback signal fed back from the first coupler and the second feedback signal fed back from the second coupler and to provide the combined signal to the control circuitry.

5. The electronic device of claim 1, wherein the first coupler and the second coupler are disposed outside the transceiver.

6. The electronic device of claim 1, wherein the first coupler is physically closer to the first antenna than the transceiver and the second coupler is physically closer to the second antenna than the transceiver.

7. The electronic device of claim 6, wherein the electronic device includes a first electrical path between the transceiver and the first coupler and a second electrical path between the transceiver and the second coupler, and wherein the first path and the second path have different lengths.

8. The electronic device of claim 1, wherein the housing further includes a side member including a first conductive portion provided as the first antenna and a second conductive portion provided as the second antenna.

9. The electronic device of claim 1, wherein the control circuitry is configured to generate the first signal and the second signal in order to provide transmission diversity.

10. The electronic device of claim 9, wherein the first signal and the second signal are Primary Carrier Component (PCC) signals having a same frequency.

11. The electronic device of claim 1, wherein the control circuitry is configured to generate the first signal and the second signal in order to provide a beam-forming communication.

12. A method for providing a transmission diversity phase correction in an electronic device, the method comprising:
receiving a first signal at a first coupler electrically connected between a first antenna and a transceiver from the transceiver and providing the first signal to the first antenna;

receiving a second signal at a second coupler electrically connected between a second antenna and the transceiver from the transceiver and providing the second signal to the second antenna;

receiving, at a control circuitry, a first feedback signal of the first signal sent from the first coupler and a second feedback signal of the second signal sent from the second coupler;

determining, at a control circuitry, a maximum amplitude of a combined signal, which is a combination of the first feedback signal and the second feedback signal; and adjusting, at the transceiver, at least one of a phase of the first signal and a phase of the second signal such that the maximum amplitude of the combined signal corresponds to a predetermined value.

13. The method of claim 12, further comprising:
combining the first feedback signal fed back from the first coupler and the second feedback signal fed back from the second coupler.

14. The method of claim 12, wherein, when a phase difference between the first signal and second signal is equal to or less than a predetermined value, it is determined that the phases of the transmission signals coincide with each other.

15. The method of claim 12, further comprising:
generating the first signal and the second signal in order to provide transmission diversity.

16. The method of claim 12, wherein
the first signal and the second signal are Primary Carrier Component (PCC) signals having the same frequency.

* * * * *